US010697287B2

(12) United States Patent
Romer et al.

(10) Patent No.: US 10,697,287 B2
(45) Date of Patent: Jun. 30, 2020

(54) PLUNGER LIFT MONITORING VIA A DOWNHOLE WIRELESS NETWORK FIELD

(71) Applicants: Michael C. Romer, The Woodlands, TX (US); Randy C. Tolman, Spring, TX (US); Timothy I. Morrow, Humble, TX (US)

(72) Inventors: Michael C. Romer, The Woodlands, TX (US); Randy C. Tolman, Spring, TX (US); Timothy I. Morrow, Humble, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 128 days.

(21) Appl. No.: 15/665,952

(22) Filed: Aug. 1, 2017

(65) Prior Publication Data
US 2018/0058191 A1 Mar. 1, 2018

Related U.S. Application Data

(60) Provisional application No. 62/381,926, filed on Aug. 31, 2016, provisional application No. 62/381,330, (Continued)

(51) Int. Cl.
*E21B 43/12* (2006.01)
*E21B 47/00* (2012.01)
(Continued)

(52) U.S. Cl.
CPC .......... *E21B 47/008* (2020.05); *E21B 43/121* (2013.01); *E21B 43/122* (2013.01);
(Continued)

(58) Field of Classification Search
CPC ...... E21B 47/0007; E21B 47/06; E21B 47/09; E21B 47/122; E21B 47/123; E21B 47/14;
(Continued)

(56) References Cited

U.S. PATENT DOCUMENTS 3,103,643 A 9/1963 Kalbfell .......................... 340/17
3,205,477 A 9/1965 Kalbfell .......................... 340/18
(Continued)

FOREIGN PATENT DOCUMENTS

CN 102733799 6/2014 ............. E21B 47/16
EP 0636763 2/1995 ............. E21B 47/12
(Continued)

OTHER PUBLICATIONS

U.S. Appl. No. 15/666,334, filed Aug. 1, 2017, Walker, Katie M. et al.
(Continued)

*Primary Examiner* — Giovanna Wright
*Assistant Examiner* — Yanick A Akaragwe
(74) *Attorney, Agent, or Firm* — ExxonMobil Upstream Research Company—Law Department

(57) ABSTRACT

A real-time system for monitoring plunger properties in a gas producing well is provided. The system includes a plunger comprising a substantially cylindrical body; at least one sensor disposed along a tubular body; at least one sensor communications node placed along the tubular body and affixed to a wall of the tubular body, the sensor communications node being in electrical communication with the at least one sensor and configured to receive signals therefrom; a topside communications node placed proximate a surface; a plurality of intermediate communications nodes spaced along the tubular body and attached to a wall of the tubular body; wherein the intermediate communications nodes are configured to transmit signals received from the at least one sensor communications node to the topside communications node in substantially a node-to-node arrangement; a receiver at the surface configured to receive signals from the topside communications node; and a plunger control system structured and arranged to communicate with the topside com-
(Continued)

munications node. A method of monitoring plunger properties and controlling plunger performance, and a hydrocarbon well are also provided.

34 Claims, 4 Drawing Sheets

Related U.S. Application Data filed on Aug. 30, 2016, provisional application No. 62/381,335, filed on Aug. 30, 2016, provisional application No. 62/428,367, filed on Nov. 30, 2016, provisional application No. 62/428,374, filed on Nov. 30, 2016, provisional application No. 62/428,385, filed on Nov. 30, 2016, provisional application No. 62/433,491, filed on Dec. 13, 2016, provisional application No. 62/428,425, filed on Nov. 30, 2016.

(51) Int. Cl.
    *E21B 47/008* (2012.01)
    *E21B 47/14* (2006.01)
    *E21B 47/09* (2012.01)
    *E21B 49/08* (2006.01)
    *E21B 47/06* (2012.01)
    *G01V 1/44* (2006.01)
    *E21B 47/13* (2012.01)
    *E21B 47/135* (2012.01)
    *E21B 41/02* (2006.01)
    *E21B 37/06* (2006.01)
    *G01V 1/52* (2006.01)
    *G01V 1/22* (2006.01)
    *E21B 47/017* (2012.01)

(52) U.S. Cl.
    CPC .............. *E21B 47/06* (2013.01); *E21B 47/09* (2013.01); *E21B 47/13* (2020.05); *E21B 47/135* (2020.05); *E21B 47/14* (2013.01); *E21B 49/08* (2013.01); *G01V 1/44* (2013.01); *E21B 37/06* (2013.01); *E21B 41/02* (2013.01); *E21B 47/017* (2020.05); *G01V 1/22* (2013.01); *G01V 1/52* (2013.01)

(58) Field of Classification Search
    CPC .... E21B 47/011; E21B 43/122; E21B 43/121; E21B 49/08; E21B 41/02; G01V 1/44; G01V 1/22; G01V 1/52
    See application file for complete search history.

(56) References Cited

U.S. PATENT DOCUMENTS

| | | | |
|---|---|---|---|
| 3,512,407 A | 5/1970 | Zill | 73/152 |
| 3,637,010 A | 1/1972 | Malay et al. | 166/51 |
| 3,741,301 A | 6/1973 | Malay et al. | 166/191 |
| 3,781,783 A | 12/1973 | Tucker | 340/18 |
| 3,790,930 A | 2/1974 | Lamel et al. | 340/18 |
| 3,900,827 A | 8/1975 | Lamel et al. | 340/18 |
| 3,906,434 A | 9/1975 | Lamel et al. | 340/18 |
| 4,001,773 A | 1/1977 | Lamel et al. | 340/18 |
| 4,283,780 A | 8/1981 | Nardi | 367/82 |
| 4,298,970 A | 11/1981 | Shawhan et al. | 367/82 |
| 4,302,826 A | 11/1981 | Kent et al. | 367/82 |
| 4,314,365 A | 2/1982 | Peterson et al. | 367/82 |
| 4,884,071 A | 11/1989 | Howard | 340/854 |
| 4,962,489 A | 10/1990 | Medlin et al. | 367/32 |
| 5,128,901 A | 7/1992 | Drumheller | 367/82 |
| 5,136,613 A | 8/1992 | Dumestre, III | 375/1 |
| 5,166,908 A | 11/1992 | Montgomery | 367/165 |
| 5,182,946 A | 2/1993 | Boughner et al. | 73/151 |
| 5,234,055 A | 8/1993 | Cornette | 166/278 |
| 5,283,768 A | 2/1994 | Rorden | 367/83 |
| 5,373,481 A | 12/1994 | Orban et al. | 367/82 |
| 5,468,025 A | 11/1995 | Adinolfe et al. | 285/114 |
| 5,480,201 A | 1/1996 | Mercer | 294/67.31 |
| 5,495,230 A | 2/1996 | Lian | 340/551 |
| 5,562,240 A | 10/1996 | Campbell | 227/130 |
| 5,592,438 A | 1/1997 | Rorden et al. | 367/83 |
| 5,667,650 A | 9/1997 | Face et al. | 204/298.07 |
| 5,850,369 A | 12/1998 | Rorden et al. | 367/83 |
| 5,857,146 A | 1/1999 | Kido | 455/38.3 |
| 5,924,499 A | 7/1999 | Birchak et al. | 175/40 |
| 5,960,883 A | 10/1999 | Tubel et al. | 166/313 |
| 5,995,449 A | 11/1999 | Green et al. | 367/83 |
| 6,049,508 A | 4/2000 | Deflandre | 367/48 |
| 6,125,080 A | 9/2000 | Sonnenschein et al. | 367/134 |
| 6,128,250 A | 10/2000 | Reid et al. | 367/153 |
| 6,177,882 B1 | 1/2001 | Ringgenberg et al. | 340/853.7 |
| 6,236,850 B1 | 5/2001 | Desai | 455/343 |
| 6,239,690 B1 | 5/2001 | Burbidge et al. | 340/10.33 |
| 6,300,743 B1 | 10/2001 | Patino et al. | 320/106 |
| 6,320,820 B1 | 11/2001 | Gardner et al. | 367/81 |
| 6,324,904 B1 | 12/2001 | Ishikawa et al. | 73/152.03 |
| 6,360,769 B1 | 3/2002 | Brisco | 137/268 |
| 6,394,184 B2 | 5/2002 | Tolman et al. | 166/281 |
| 6,400,646 B1 | 6/2002 | Shah et al. | 367/82 |
| 6,429,784 B1 | 8/2002 | Beique et al. | 340/853.2 |
| 6,462,672 B1 | 10/2002 | Besson | 340/853.2 |
| 6,543,538 B2 | 4/2003 | Tolman et al. | 166/284 |
| 6,670,880 B1 | 12/2003 | Hall et al. | 336/132 |
| 6,679,332 B2 | 1/2004 | Vinegar et al. | 166/373 |
| 6,695,277 B1 | 2/2004 | Gallis | 241/191 |
| 6,702,019 B2 | 3/2004 | Dusterhoft et al. | 166/278 |
| 6,717,501 B2 | 4/2004 | Hall et al. | 336/132 |
| 6,727,827 B1 | 4/2004 | Edwards et al. | 340/854.9 |
| 6,772,837 B2 | 8/2004 | Dusterhoft et al. | 166/278 |
| 6,816,082 B1 | 11/2004 | Laborde | 340/853.3 |
| 6,868,037 B2 | 3/2005 | Dasgupta et al. | 367/54 |
| 6,880,634 B2 | 4/2005 | Gardner et al. | 166/250.01 |
| 6,883,608 B2 | 4/2005 | Parlar et al. | 166/278 |
| 6,899,178 B2 | 5/2005 | Tubel | 166/313 |
| 6,909,667 B2 | 6/2005 | Shah et al. | 367/83 |
| 6,912,177 B2 | 6/2005 | Smith | 367/82 |
| 6,920,085 B2 | 7/2005 | Finke et al. | 367/83 |
| 6,930,616 B2 | 8/2005 | Tang et al. | 340/854.4 |
| 6,940,392 B2 | 9/2005 | Chan et al. | 340/10.4 |
| 6,940,420 B2 | 9/2005 | Jenkins | 340/855.6 |
| 6,953,094 B2 | 10/2005 | Ross et al. | 166/381 |
| 6,956,791 B2 | 10/2005 | Dopf et al. | 367/82 |
| 6,980,929 B2 | 12/2005 | Aronstam et al. | 702/188 |
| 6,987,463 B2 | 1/2006 | Beique et al. | 340/856.3 |
| 7,006,918 B2 | 2/2006 | Economides et al. | 702/1 |
| 7,011,157 B2 | 3/2006 | Costley et al. | 166/311 |
| 7,036,601 B2 | 5/2006 | Berg et al. | 166/385 |
| 7,051,812 B2 | 5/2006 | McKee et al. | 166/305.1 |
| 7,064,676 B2 | 6/2006 | Hall et al. | 350/853.1 |
| 7,082,993 B2 | 8/2006 | Ayoub et al. | 166/250.1 |
| 7,090,020 B2 | 8/2006 | Hill et al. | 166/373 |
| 7,140,434 B2 | 11/2006 | Chouzenoux et al. | 166/250.11 |
| 7,219,762 B2 | 5/2007 | James et al. | 181/105 |
| 7,224,288 B2 | 5/2007 | Hall et al. | 340/853.7 |
| 7,228,902 B2 | 6/2007 | Oppelt | 166/250.02 |
| 7,249,636 B2 | 7/2007 | Ohmer | 166/383 |
| 7,217,050 B2 | 8/2007 | Stewart et al. | 367/82 |
| 7,252,152 B2 | 8/2007 | LoGiudice et al. | 166/386 |
| 7,261,154 B2 | 8/2007 | Hall et al. | 166/242.2 |
| 7,261,162 B2 | 8/2007 | Deans et al. | 166/336 |
| 7,275,597 B2 | 10/2007 | Hall et al. | 166/297 |
| 7,277,026 B2 | 10/2007 | Hall et al. | 340/854.8 |
| RE40,032 E | 1/2008 | van Borkhorst et al. | 455/343.2 |
| 7,317,990 B2 | 1/2008 | Sinha et al. | 702/6 |
| 7,321,788 B2 | 1/2008 | Addy et al. | 455/574 |
| 7,322,416 B2 | 1/2008 | Burris, II et al. | 166/308.1 |
| 7,325,605 B2 | 2/2008 | Fripp et al. | 166/250.01 |
| 7,339,494 B2 | 3/2008 | Shah et al. | 340/855.7 |
| 7,348,593 B2 | 3/2008 | Huang et al. | 340/854.3 |
| 7,385,523 B2 | 6/2008 | Thomeer et al. | 340/854.8 |
| 7,387,165 B2 | 6/2008 | Lopez de Cardenas et al. | 166/313 |

(56) References Cited

U.S. PATENT DOCUMENTS

| | | | |
|---|---|---|---|
| 7,411,517 B2 | 8/2008 | Flanagan | 340/854.4 |
| 7,477,160 B2 | 1/2009 | Lemenager et al. | 340/853.1 |
| 7,516,792 B2 | 4/2009 | Lonnes et al. | 166/308.1 |
| 7,551,057 B2 | 6/2009 | King et al. | 340/5.72 |
| 7,590,029 B2 | 9/2009 | Tingley | 367/82 |
| 7,595,737 B2 | 9/2009 | Fink et al. | 340/854.4 |
| 7,602,668 B2 | 10/2009 | Liang et al. | 367/25 |
| 7,649,473 B2 | 1/2010 | Johnson et al. | 340/853.1 |
| 7,750,808 B2 | 7/2010 | Masino et al. | 340/572.1 |
| 7,775,279 B2 | 8/2010 | Marya et al. | 166/297 |
| 7,787,327 B2 | 8/2010 | Tang et al. | 367/27 |
| 7,819,188 B2 | 10/2010 | Auzerais et al. | 155/250 |
| 7,828,079 B2 | 11/2010 | Oothoudt | 175/20 |
| 7,831,283 B2 | 11/2010 | Ogushi et al. | 455/574 |
| 7,913,773 B2 | 3/2011 | Li et al. | 175/40 |
| 7,952,487 B2 | 5/2011 | Montebovi | 340/636.1 |
| 7,994,932 B2 | 8/2011 | Huang et al. | 340/854.3 |
| 8,004,421 B2 | 8/2011 | Clark | 340/854.4 |
| 8,044,821 B2 | 10/2011 | Mehta | 340/855.7 |
| 8,049,506 B2 | 11/2011 | Lazarev | 324/333 |
| 8,115,651 B2 | 2/2012 | Camwell et al. | 340/853.2 |
| 8,117,907 B2 | 2/2012 | Han et al. | 73/152.58 |
| 8,157,008 B2 | 4/2012 | Lilley | 166/253.1 |
| 8,162,050 B2 | 4/2012 | Roddy et al. | 166/253.1 |
| 8,220,542 B2 | 7/2012 | Whitsitt et al. | 166/278 |
| 8,237,585 B2 | 8/2012 | Zimmerman | 340/854.6 |
| 8,242,928 B2 | 8/2012 | Prammer | 340/853.7 |
| 8,276,674 B2 | 10/2012 | Lopez de Cardenas et al. | 166/373 |
| 8,284,075 B2 | 10/2012 | Fincher et al. | 340/854.4 |
| 8,284,947 B2 | 10/2012 | Giesbrecht et al. | 381/66 |
| 8,316,936 B2 | 11/2012 | Roddy et al. | 166/253.1 |
| 8,330,617 B2 | 12/2012 | Chen et al. | 340/854.6 |
| 8,347,982 B2 | 1/2013 | Hannegan et al. | 175/5 |
| 8,358,220 B2 | 1/2013 | Savage | 340/853.1 |
| 8,376,065 B2 | 2/2013 | Teodorescu et al. | 175/40 |
| 8,381,822 B2 | 2/2013 | Hales et al. | 166/377 |
| 8,388,899 B2 | 3/2013 | Mitani et al. | 422/179 |
| 8,411,530 B2 | 4/2013 | Slocum et al. | 367/90 |
| 8,434,354 B2 | 5/2013 | Crow et al. | 73/152.04 |
| 8,494,070 B2 | 7/2013 | Luo et al. | 375/262 |
| 8,496,055 B2 | 7/2013 | Mootoo et al. | 166/278 |
| 8,539,890 B2 | 9/2013 | Tripp et al. | 109/25 |
| 8,544,564 B2 | 10/2013 | Moore et al. | 175/50 |
| 8,552,597 B2 | 10/2013 | Song et al. | 307/149 |
| 8,556,302 B2 | 10/2013 | Dole | 285/367 |
| 8,559,272 B2 | 10/2013 | Wang | |
| 8,596,359 B2 | 12/2013 | Grigsby et al. | 166/278 |
| 8,605,548 B2 | 12/2013 | Froelich | 367/82 |
| 8,607,864 B2 | 12/2013 | Mcleod et al. | 166/250.1 |
| 8,664,958 B2 | 3/2014 | Simon | 324/338 |
| 8,672,875 B2 | 3/2014 | Vanderveen et al. | 604/67 |
| 8,675,779 B2 | 3/2014 | Zeppetelle et al. | 375/340 |
| 8,683,859 B2 | 4/2014 | Godager | 73/152.54 |
| 8,689,621 B2 | 4/2014 | Godager | 73/152.54 |
| 8,701,480 B2 | 4/2014 | Eriksen | 73/152.51 |
| 8,750,789 B2 | 6/2014 | Baldemair et al. | 455/11.1 |
| 8,787,840 B2 | 7/2014 | Srinivasan et al. | 455/69 |
| 8,805,632 B2 | 8/2014 | Coman et al. | 702/89 |
| 8,826,980 B2 | 9/2014 | Neer | 166/255.1 |
| 8,833,469 B2 | 9/2014 | Purkis | 166/373 |
| 8,893,784 B2 | 11/2014 | Abad | E21B 43/26 |
| 8,910,716 B2 | 12/2014 | Newton et al. | 166/373 |
| 8,994,550 B2 | 3/2015 | Millot et al. | E21B 47/16 |
| 8,995,837 B2 | 3/2015 | Mizuguchi et al. | H04B 10/27 |
| 9,062,508 B2 | 6/2015 | Huval et al. | E21B 47/122 |
| 9,062,531 B2 | 6/2015 | Jones | E21B 47/082 |
| 9,075,155 B2 | 7/2015 | Luscombe et al. | G01V 1/226 |
| 9,078,055 B2 | 7/2015 | Nguyen et al. | H04R 5/00 |
| 9,091,153 B2 | 7/2015 | Yang et al. | E21B 47/12 |
| 9,133,705 B2 | 9/2015 | Angeles Boza | E21B 47/12 |
| 9,140,097 B2 | 9/2015 | Themig et al. | E21B 34/12 |
| 9,144,894 B2 | 9/2015 | Barnett et al. | B25B 17/00 |
| 9,206,645 B2 | 12/2015 | Hallundbaek | E21B 7/04 |
| 9,279,301 B2 | 3/2016 | Lovorn et al. | E21B 21/103 |
| 9,284,819 B2 | 3/2016 | Tolman et al. | E21B 41/00 |
| 9,284,834 B2 | 3/2016 | Alteirac et al. | E21B 47/12 |
| 9,310,510 B2 | 4/2016 | Godager | G01V 3/38 |
| 9,331,696 B2 | 5/2016 | Hay | E21B 47/12 |
| 9,333,350 B2 | 5/2016 | Rise et al. | A61N 1/36082 |
| 9,359,841 B2 | 6/2016 | Hall | E21B 23/00 |
| 9,363,605 B2 | 6/2016 | Goodman et al. | H04R 17/00 |
| 9,376,908 B2 | 6/2016 | Ludwig et al. | E21B 47/01 |
| 9,441,470 B2 | 9/2016 | Guerrero et al. | E21B 43/14 |
| 9,515,748 B2 | 12/2016 | Jeong et al. | G10L 25/90 |
| 9,557,434 B2 | 1/2017 | Keller et al. | G01V 1/52 |
| 9,617,829 B2 | 4/2017 | Dale et al. | E21B 41/00 |
| 9,617,850 B2 | 4/2017 | Fripp et al. | E21B 47/18 |
| 9,631,485 B2 | 4/2017 | Keller et al. | E21B 47/16 |
| 9,657,564 B2 | 5/2017 | Stolpman | E21B 47/16 |
| 9,664,013 B2 | 5/2017 | Logan et al. | E21B 47/122 |
| 9,670,773 B2 | 6/2017 | Croux | E21B 47/16 |
| 9,683,434 B2 | 6/2017 | Machocki | E21B 44/00 |
| 9,686,021 B2 | 6/2017 | Merino | E21B 47/16 |
| 9,715,031 B2 | 7/2017 | Contant et al. | E21B 47/122 |
| 9,721,448 B2 | 8/2017 | Wu et al. | G08B 21/20 |
| 9,759,062 B2 | 9/2017 | Deffenbaugh et al. | E21B 47/16 |
| 9,816,373 B2 | 11/2017 | Howell et al. | E21B 47/16 |
| 9,822,634 B2 | 11/2017 | Gao | E21B 47/122 |
| 9,863,222 B2 | 1/2018 | Morrow et al. | E21B 43/122 |
| 9,879,525 B2 | 1/2018 | Morrow et al. | E21B 47/12 |
| 9,945,204 B2 | 4/2018 | Ross et al. | E21B 33/127 |
| 9,963,955 B2 | 5/2018 | Tolman et al. | E21B 43/119 |
| 10,100,635 B2 | 10/2018 | Keller et al. | E21B 47/18 |
| 10,103,846 B2 | 10/2018 | Van Zelm et al. | E21B 47/12 |
| 10,132,149 B2 | 11/2018 | Morrow et al. | E21B 43/267 |
| 10,145,228 B2 | 12/2018 | Yarus et al. | E21B 44/00 |
| 10,167,716 B2 | 1/2019 | Clawson et al. | E21B 47/14 |
| 10,167,717 B2 | 1/2019 | Disko et al. | E21B 47/16 |
| 10,190,410 B2 | 1/2019 | Clawson et al. | E21B 47/14 |
| 10,196,862 B2 | 2/2019 | Li-Leger et al. | E21B 17/02 |
| 2002/0180613 A1 | 12/2002 | Shi et al. | E21B 47/18 |
| 2003/0056953 A1 | 3/2003 | Tumlin et al. | 166/298 |
| 2003/0117896 A1 | 6/2003 | Sakuma et al. | 367/81 |
| 2004/0020063 A1 | 2/2004 | Lewis et al. | 33/313 |
| 2004/0200613 A1 | 10/2004 | Fripp et al. | 166/250.01 |
| 2004/0239521 A1 | 12/2004 | Zierolf | 340/854.1 |
| 2005/0269083 A1 | 12/2005 | Burris et al. | 166/255.2 |
| 2005/0284659 A1 | 12/2005 | Hall et al. | 175/27 |
| 2006/0033638 A1* | 2/2006 | Hall | E21B 21/08 340/854.6 |
| 2006/0041795 A1 | 2/2006 | Gabelmann et al. | 714/699 |
| 2006/0054329 A1* | 3/2006 | Chisholm | E21B 43/121 166/372 |
| 2006/0090893 A1* | 5/2006 | Sheffield | E21B 43/121 166/250.15 |
| 2007/0139217 A1 | 6/2007 | Beique et al. | 340/856.3 |
| 2007/0146351 A1 | 6/2007 | Katsurahira et al. | 345/179 |
| 2007/0156359 A1 | 7/2007 | Varsamis et al. | 702/69 |
| 2007/0219758 A1 | 9/2007 | Bloomfield | 702/190 |
| 2007/0272411 A1 | 11/2007 | Lopez de Cardenas et al. | 166/305.1 |
| 2008/0030365 A1 | 2/2008 | Fripp et al. | E21B 47/16 |
| 2008/0110644 A1 | 5/2008 | Howell et al. | 166/387 |
| 2008/0185144 A1 | 8/2008 | Lovell | 166/250.17 |
| 2008/0304360 A1 | 12/2008 | Mozer | 367/117 |
| 2009/0003133 A1 | 1/2009 | Dalton et al. | 367/82 |
| 2009/0030614 A1 | 1/2009 | Carnegie et al. | 702/6 |
| 2009/0034368 A1 | 2/2009 | Johnson | 367/83 |
| 2009/0045974 A1 | 2/2009 | Patel | 340/854.6 |
| 2009/0080291 A1 | 3/2009 | Tubel et al. | 367/81 |
| 2009/0166031 A1 | 7/2009 | Hernandez | 166/250.01 |
| 2010/0013663 A1 | 1/2010 | Cavender et al. | 340/854.3 |
| 2010/0089141 A1 | 4/2010 | Rioufol et al. | 73/152.28 |
| 2010/0133004 A1 | 6/2010 | Burleson et al. | 175/2 |
| 2010/0182161 A1 | 7/2010 | Robbins et al. | 340/853.7 |
| 2010/0212891 A1 | 8/2010 | Stewart et al. | 166/250.12 |
| 2011/0061862 A1 | 3/2011 | Loretz et al. | 166/250.11 |
| 2011/0066378 A1 | 3/2011 | Lerche et al. | 702/6 |
| 2011/0168403 A1 | 7/2011 | Patel | 166/373 |
| 2011/0188345 A1 | 8/2011 | Wang | 367/34 |
| 2011/0297376 A1 | 12/2011 | Holderman et al. | 166/278 |
| 2011/0297673 A1 | 12/2011 | Zbat et al. | 219/756 |

(56) References Cited

U.S. PATENT DOCUMENTS

| | | | |
|---|---|---|---|
| 2011/0301439 A1 | 12/2011 | Albert et al. | 600/301 |
| 2011/0315377 A1 | 12/2011 | Rioufol | 166/250.17 |
| 2012/0043079 A1 | 2/2012 | Wassouf et al. | 166/250 |
| 2012/0126992 A1 | 5/2012 | Rodney et al. | 340/850 |
| 2012/0152562 A1 | 6/2012 | Newton et al. | 166/369 |
| 2012/0179377 A1 | 7/2012 | Lie | 702/6 |
| 2013/0000981 A1 | 1/2013 | Grimmer et al. | 175/45 |
| 2013/0003503 A1 | 1/2013 | L'Her et al. | 367/106 |
| 2013/0106615 A1 | 5/2013 | Prammer | 340/854.6 |
| 2013/0138254 A1 | 5/2013 | Seals et al. | 700/282 |
| 2013/0192823 A1 | 8/2013 | Barrilleaux et al. | 166/250.01 |
| 2013/0248172 A1 | 9/2013 | Angeles Boza et al. | |
| 2013/0278432 A1 | 10/2013 | Shashoua et al. | 340/853.7 |
| 2013/0319102 A1 | 12/2013 | Riggenberg et al. | 73/152.28 |
| 2014/0060840 A1 | 3/2014 | Hartshorne et al. | 166/300 |
| 2014/0062715 A1 | 3/2014 | Clark | 340/853.2 |
| 2014/0102708 A1 | 4/2014 | Purkis et al. | 166/308.1 |
| 2014/0133276 A1 | 5/2014 | Volker et al. | 367/82 |
| 2014/0152659 A1 | 6/2014 | Davidson et al. | 345/420 |
| 2014/0153368 A1 | 6/2014 | Bar-Cohen et al. | 367/81 |
| 2014/0166266 A1 | 6/2014 | Read | 166/250.01 |
| 2014/0170025 A1 | 6/2014 | Weiner et al. | 422/82.01 |
| 2014/0266769 A1 | 9/2014 | van Zelm | 340/854.3 |
| 2014/0327552 A1 | 11/2014 | Filas et al. | 340/854.6 |
| 2014/0352955 A1 | 12/2014 | Tubel et al. | 166/250.15 |
| 2015/0003202 A1 | 1/2015 | Palmer et al. | 367/82 |
| 2015/0009040 A1 | 1/2015 | Bowles et al. | 340/854.6 |
| 2015/0027687 A1 | 1/2015 | Tubel | 166/72 |
| 2015/0041124 A1 | 2/2015 | Rodriguez | 166/255.1 |
| 2015/0041137 A1 | 2/2015 | Rodriguez | 166/301 |
| 2015/0152727 A1 | 6/2015 | Fripp et al. | E21B 47/14 |
| 2015/0159481 A1 | 6/2015 | Mebarkia et al. | E21B 47/065 |
| 2015/0167425 A1 | 6/2015 | Hammer et al. | E21B 34/06 |
| 2015/0176370 A1 | 6/2015 | Greening et al. | E21B 41/00 |
| 2015/0292319 A1 | 10/2015 | Disko et al. | E21B 47/16 |
| 2015/0292320 A1 | 10/2015 | Lynk et al. | E21B 47/16 |
| 2015/0292321 A1* | 10/2015 | Keller | E21B 47/12 367/81 |
| 2015/0300159 A1 | 10/2015 | Stiles et al. | E21B 47/16 |
| 2015/0330200 A1 | 11/2015 | Richard et al. | E21B 44/00 |
| 2015/0337642 A1 | 11/2015 | Spacek | E21B 44/005 |
| 2015/0354351 A1 | 12/2015 | Morrow et al. | E21B 47/16 |
| 2015/0377016 A1 | 12/2015 | Ahmad | E21B 47/122 |
| 2016/0010446 A1 | 1/2016 | Logan et al. | E21B 47/122 |
| 2016/0047230 A1 | 2/2016 | Livescu et al. | E21B 47/10 |
| 2016/0047233 A1 | 2/2016 | Butner et al. | E21B 47/12 |
| 2016/0076363 A1 | 3/2016 | Morrow et al. | E21B 47/12 |
| 2016/0109606 A1 | 4/2016 | Market et al. | G01V 1/50 |
| 2016/0215612 A1 | 7/2016 | Morrow | E21B 47/122 |
| 2017/0138185 A1 | 5/2017 | Saed et al. | E21B 47/16 |
| 2017/0145811 A1 | 5/2017 | Robison et al. | E21B 47/0007 |
| 2017/0152741 A1 | 6/2017 | Park et al. | E21B 47/123 |
| 2017/0167249 A1 | 6/2017 | Lee et al. | E21B 47/14 |
| 2017/0204719 A1 | 7/2017 | Babakhani | E21B 47/0005 |
| 2017/0254183 A1 | 9/2017 | Vasques et al. | E21B 47/12 |
| 2017/0293044 A1 | 10/2017 | Gilstrap et al. | G01V 1/50 |
| 2017/0314386 A1 | 11/2017 | Orban et al. | E21B 47/091 |
| 2018/0010449 A1 | 1/2018 | Roberson | E21B 47/16 |
| 2018/0058191 A1 | 3/2018 | Romer et al. | E21B 47/0007 |
| 2018/0058198 A1 | 3/2018 | Ertas et al. | E21B 47/12 |
| 2018/0058202 A1 | 3/2018 | Disko et al. | E21B 47/14 |
| 2018/0058203 A1 | 3/2018 | Clawson et al. | E21B 47/14 |
| 2018/0058204 A1 | 3/2018 | Clawson et al. | E21B 47/14 |
| 2018/0058205 A1 | 3/2018 | Clawson et al. | E21B 47/14 |
| 2018/0058206 A1 | 3/2018 | Zhang et al. | E21B 47/16 |
| 2018/0058207 A1 | 3/2018 | Song et al. | E21B 47/16 |
| 2018/0058208 A1 | 3/2018 | Song et al. | E21B 47/16 |
| 2018/0058209 A1 | 3/2018 | Song et al. | E21B 47/16 |
| 2018/0066490 A1 | 3/2018 | Kjos | E21B 33/035 |
| 2018/0066510 A1 | 3/2018 | Walker et al. | E21B 47/011 |

FOREIGN PATENT DOCUMENTS

| | | | |
|---|---|---|---|
| EP | 1409839 | 4/2005 | E21B 43/1185 |
| EP | 2677698 | 12/2013 | H04L 12/28 |
| WO | WO2002/027139 | 4/2002 | E21B 43/12 |
| WO | WO2010/074766 | 7/2010 | A41C 1/14 |
| WO | WO2013/079928 | 6/2013 | E21B 47/12 |
| WO | WO 2013/079928 A2 | 6/2013 | |
| WO | WO 2013/112273 A2 | 8/2013 | |
| WO | WO2014/018010 | 1/2014 | E21B 47/12 |
| WO | WO 2014/018010 A1 | 1/2014 | |
| WO | WO2014/049360 | 4/2014 | E21B 47/12 |
| WO | WO 2014/049360 A2 | 4/2014 | |
| WO | WO2014/100271 | 6/2014 | E21B 47/12 |
| WO | WO2014/134741 | 9/2014 | E21B 47/13 |
| WO | WO 2014/134741 A1 | 9/2014 | |
| WO | WO2015/117060 | 8/2015 | E21B 47/12 |

OTHER PUBLICATIONS

U.S. Appl. No. 16/139,373, filed Sep. 24, 2018, Yi, Xiaohua et al.
U.S. Appl. No. 16/139,384, filed Oct. 13, 2017, Disko, Mark M. et al.
U.S. Appl. No. 16/139,394, filed Oct. 13, 2017, Song, Limin et al.
U.S. Appl. No. 16/394,403, filed Oct. 13, 2017, Song, Limin et al.
U.S. Appl. No. 16/139414, filed Oct. 13, 2017, Zhang, Yibing et al.
U.S. Appl. No. 16/139,421, filed Oct. 13, 2017, Song, Limin et al.
U.S. Appl. No. 16/139,427, filed Oct. 13, 2017, Disko, Mark M. et al.
U.S. Appl. No. 16/175418, filed Oct. 30, 2018, Kent, David K. et al.
U.S. Appl. No. 62/588067, filed Nov. 17, 2017, Song, Limin et al.
U.S. Appl. No. 62/588080, filed Nov. 17, 2017, Kinn, Timothy F. et al.
U.S. Appl. No. 62/588103, filed Nov. 17, 2017, Yi, Xiaohua et al.
Arroyo, Javier et al. (2009) "Forecasting Histogram Time Series with K-Nearest Neighbours Methods," *International Journal of Forecasting*, v.25, pp. 192-207.
Arroyo, Javier et al. (2011) "Smoothing Methods for Histogram-Valued Time Seriers: An Application to Value-at-Risk," Univ. of California, Dept. of Economics, www.wileyonlinelibrary.com, Mar. 8, 2011, 28 pages.
Arroyo, Javier et al. (2011) "Forecasting with Interval and Histogram Data Some Financial Applications," Univ. of California, Dept. of Economics, 46 pages.
Emerson Process Management (2011), "Roxar downhole Wireless PT sensor system," www.roxar.com or downhole@roxar.com, 2 pgs.
Gonzalez-Rivera, Gloria et al. (2012) "Time Series Modeling of Histogram-Valued Data: The Daily Histogram Time Series of S&P500 Intradaily Returns," *International Journal of Forecasting*, v.28, 36 pgs.
Gutierrez-Estevez, M. A. et al. (2013) "Acoustic Boardband Communications Over Deep Drill Strings using Adaptive OFDM", IEEE Wireless Comm. & Networking Conf., pp. 4089-4094.
Qu, X. et al. (2011) "Reconstruction fo Self-Sparse 20 NMR Spectra From undersampled Data In The Indirect Dimension", pp. 8888-8909.
U.S. Department of Defense (1999) "Interoperability and Performance Standards for Medium and High Frequency Radio Systems," MIL-STD-188-141B, Mar. 1, 1999, 584 pages.

* cited by examiner

PLUNGER LIFT MONITORING VIA A DOWNHOLE WIRELESS NETWORK FIELD

CROSS REFERENCE TO RELATED APPLICATION

This application claims the benefit of U.S. Provisional Application Ser. No. 62/381,926 filed on Aug. 31, 2016, entitled "Plunger Lift Monitoring Via a Downhole Wireless Network Field," U.S. Provisional Application Ser. No. 62/381,330 filed Aug. 30, 2016, entitled "Communication Networks, Relay Nodes for Communication Networks, and Methods of Transmitting Data Among a Plurality of Relay Nodes," U.S. Provisional Application Ser. No. 62/381,335, filed Aug. 30, 2016 entitled "Zonal Isolation Devices Including Sensing and Wireless Telemetry and Methods of Utilizing the Same," U.S. Provisional Application Ser. No. 62/428,367, filed Nov. 30, 2016, entitled "Dual Transducer Communications Node for Downhole Acoustic Wireless Networks and Method Employing Same," U.S. Provisional Application Ser. No. 62/428,374, filed Nov. 30, 2016, entitled "Hybrid Downhole Acoustic Wireless Network," U.S. Provisional Application Ser. No. 62/428,385, filed Nov. 30, 2016 entitled "Methods of Acoustically Communicating And Wells That Utilize The Methods," U.S. Provisional Application Ser. No. 62/433,491, filed Dec. 13, 2016 entitled "Methods of Acoustically Communicating And Wells That Utilize The Methods," and U.S. Provisional Application Ser. No. 62/428,425 filed Nov. 30, 2016, entitled "Acoustic Housing for Tubulars," the disclosures of which are incorporated herein by reference in their entireties.

FIELD

The present disclosure relates generally to methods and systems for improving production from wells, and in particular to a real-time method and system for monitoring plunger properties.

BACKGROUND

Horizontal and vertical gaseous hydrocarbon wells may accumulate liquids within a wellbore conduit thereof. These liquids may slow, resist, block, and/or occlude flow of a wellbore fluid stream within the wellbore conduit, thereby decreasing a production rate of the wellbore fluid stream from the wellbore conduit. This especially may be true late in the lifetime of the gaseous hydrocarbon well and/or after the production rate of the wellbore fluid stream decreases below a threshold production rate.

A gas-dominated well can be significantly advantaged by the employment of a cyclic plunger when flow rates have dropped below the critical lifting velocity. The plunger provides a barrier that inhibits gas breakthrough of the liquid slug or column. The differential pressure created by this inhibiting action assists the well in lifting liquids to the surface with lower gas velocities than those normally reached. This mitigates the cost of installing smaller internal diameter tubing to increase the gas velocity.

Plungers typically "rest" at the surface in a lubricator or section of pipe above the wellhead valves. The lubricator can drop the plunger into the well on an as needed basis, as determined by surface measurement and gauges. The well is normally shut in to allow the plunger to fall. After a sufficient measured (estimated) time, the well is allowed to produce again in hopes of returning the plunger back to surface along with liquids that have slowed or stopped gas production with their attendant hydrostatic weight.

A common goal for an optimized plunger lift system is the reduction of the hydrostatic head applied to the producing formation to the minimum flow impediment possible. Thus, optimization of the number of runs the plunger makes in a given period is desirous. However, actual downhole plunger velocities are unknown with current surveillance tools. Instead, average plunger velocity is determined from the plunger drop/receive cycle times. Incomplete plunger velocity information leads to less effective optimization and potential safety hazards from catastrophic collisions in the plunger lift lubricator when there is a "dry trip" (e.g., the plunger returns to surface without a cushioning fluid buffer ahead of it).

Thus, there exists a need for systems and methods to obtain real-time plunger velocities and other performance data of interest to improve plunger lift operations.

SUMMARY

In one aspect, a real-time system for monitoring plunger properties in a gas producing well is provided. The system includes a plunger comprising a substantially cylindrical body; at least one sensor disposed along a tubular body; at least one sensor communications node placed along the tubular body and affixed to a wall of the tubular body, the sensor communications node being in electrical communication with the at least one sensor and configured to receive signals therefrom; a topside communications node placed proximate a surface; a plurality of intermediate communications nodes spaced along the tubular body and attached to a wall of the tubular body; wherein the intermediate communications nodes are configured to transmit signals received from the at least one sensor communications node to the topside communications node in substantially a node-to-node arrangement; a receiver at the surface configured to receive signals from the topside communications node; and a plunger control system structured and arranged to communicate with the topside communications node.

In some embodiments, the plurality of intermediate communications nodes are configured to transmit acoustic waves, radio waves, low frequency electromagnetic waves, inductive electromagnetic waves, light, or combinations thereof.

In some embodiments, the at least one sensor communications node is configured to transmit acoustic waves, radio waves, low frequency electromagnetic waves, inductive electromagnetic waves, light, or combinations thereof.

In some embodiments, the plurality of intermediate communications nodes and the at least one sensor communications node are configured to transmit acoustic waves, providing real-time plunger lift information to the plunger control system.

In some embodiments, each of the plurality of intermediate communications nodes comprises: a sealed housing; a power source residing within the housing; and an electro-acoustic transducer.

In some embodiments, each of the plurality of intermediate communications nodes further comprises a transceiver or a separate transmitter and receiver associated with the electro-acoustic transducer structured and arranged to receive and re-transmit the acoustic waves.

In some embodiments, the at least one sensor communications node comprises: a sealed housing; a power source residing within the housing; and an electro-acoustic transducer.

In some embodiments, the at least one sensor communications node further comprises a transceiver or a separate transmitter and receiver associated with the electro-acoustic transducer that is structured and arranged to communicate with the at least one sensor and transmit acoustic waves in response thereto.

In some embodiments, the acoustic waves represent asynchronous packets of information comprising a plurality of separate tones, with at least some of the acoustic waves being indicative of a property of the plunger.

In some embodiments, the at least one sensor is selected from a plunger position sensor, a plunger wear sensor, plunger velocity sensor, a fluid density sensor, a fluid resistivity sensor, a fluid velocity sensor, a pressure drop sensor or a combination thereof. In some embodiments, the at least one sensor comprises a plurality of sensors.

In some embodiments, the at least one sensor employs passive acoustic monitoring, electromagnetic signature detection, sonar monitoring, radar monitoring, or radiation monitoring to detect plunger properties.

In some embodiments, data transmitted topside is utilized by the plunger lift control system for plunger surveillance and optimization.

In another aspect, provided is a method of monitoring plunger properties and controlling plunger performance in a gas producing well having a tubular body. The method includes sending a plunger responsive to pressure changes into the gas producing well; sensing one or more plunger properties via one or more sensors positioned along the tubular body; receiving signals from the one or more sensors; transmitting those signals via a transmitter to an intermediate communications node attached to a wall of the tubular body; transmitting signals received by the intermediate communications node to at least one additional intermediate communications node via a transmitter; transmitting signals received by the intermediate communications node to a topside communications node via a transmitter; and controlling plunger performance to minimize hydrostatic pressure within the tubular body in response to signals received from the topside communications node.

In some embodiments, the intermediate communications nodes are configured to transmit acoustic waves, radio waves, low frequency electromagnetic waves, inductive electromagnetic waves, light, or combinations thereof.

In some embodiments, the step of transmitting the signals received from the one or more sensors via a transmitter employs at least one sensor communications node configured to transmit acoustic waves, radio waves, low frequency electromagnetic waves, inductive electromagnetic waves, light, or combinations thereof.

In some embodiments, the intermediate communications nodes and the at least one sensor communications node are configured to transmit acoustic waves, providing real-time plunger lift information to a plunger control system.

In some embodiments, each of the intermediate communications nodes comprises: a sealed housing; a power source residing within the housing; and an electro-acoustic transducer.

In some embodiments, each of the intermediate communications nodes further comprises a transceiver or a separate transmitter and receiver associated with the electro-acoustic transducer structured and arranged to receive and re-transmit the acoustic waves.

In some embodiments, the at least one sensor communications node comprises: a sealed housing; a power source residing within the housing; and an electro-acoustic transducer.

In some embodiments, the at least one sensor communications node further comprises a transceiver or a separate transmitter and receiver associated with the electro-acoustic transducer that is structured and arranged to communicate with the at least one sensor and transmit acoustic waves in response thereto.

In some embodiments, the acoustic waves represent asynchronous packets of information comprising a plurality of separate tones, with at least some of the acoustic waves being indicative of a property of the plunger.

In some embodiments, the one or more sensors are selected from a plunger position sensor, a plunger wear sensor, plunger velocity sensor, a fluid density sensor, a fluid resistivity sensor, a fluid velocity sensor, a pressure drop sensor or a combination thereof.

In a further aspect, provided is a hydrocarbon well. The hydrocarbon well includes a wellbore that extends between a surface region and a subterranean formation; a tubular body that defines a wellbore conduit that extends within the wellbore; a plunger comprising a substantially cylindrical body; at least one sensor disposed along the tubular body; at least one sensor communications node placed along the tubular body and affixed to a wall of the tubular body, the sensor communications node being in electrical communication with the at least one sensor and configured to receive signals therefrom; a topside communications node placed proximate a surface; a plurality of intermediate communications nodes spaced along the tubular body and attached to a wall of the tubular body; wherein the intermediate communications nodes are configured to transmit signals received from the at least one sensor communications node to the topside communications node in substantially a node-to-node arrangement; a receiver at the surface configured to receive signals from the topside communications node; and a plunger control system structured and arranged to communicate with the topside communications node.

In some embodiments, the plurality of intermediate communications nodes are configured to transmit acoustic waves, radio waves, low frequency electromagnetic waves, inductive electromagnetic waves, light, or combinations thereof.

In some embodiments, the at least one sensor communications node is configured to transmit acoustic waves, radio waves, low frequency electromagnetic waves, inductive electromagnetic waves, light, or combinations thereof.

In some embodiments, the plurality of intermediate communications nodes and the at least one sensor communications node are configured to transmit acoustic waves, providing real-time plunger lift information to the plunger control system.

In some embodiments, each of the plurality of intermediate communications nodes comprises: a sealed housing; a power source residing within the housing; and an electro-acoustic transducer.

In some embodiments, each of the plurality of intermediate communications nodes further comprises a transceiver or a separate transmitter and receiver associated with the electro-acoustic transducer structured and arranged to receive and re-transmit the acoustic waves.

In some embodiments, the at least one sensor communications node comprises: a sealed housing; a power source residing within the housing; and an electro-acoustic transducer.

In some embodiments, the at least one sensor communications node further comprises a transceiver or a separate transmitter and receiver associated with the electro-acoustic transducer that is structured and arranged to communicate with the at least one sensor and transmit acoustic waves in response thereto.

In some embodiments, the acoustic waves represent asynchronous packets of information comprising a plurality of separate tones, with at least some of the acoustic waves being indicative of a property of the plunger.

In some embodiments, the at least one sensor is selected from a plunger position sensor, a plunger wear sensor, plunger velocity sensor, a fluid density sensor, a fluid resistivity sensor, a fluid velocity sensor, a pressure drop sensor or a combination thereof. In some embodiments, the at least one sensor comprises a plurality of sensors.

BRIEF DESCRIPTION OF THE DRAWINGS

The present disclosure is susceptible to various modifications and alternative forms, specific exemplary implementations thereof have been shown in the drawings and are herein described in detail. It should be understood, however, that the description herein of specific exemplary implementations is not intended to limit the disclosure to the particular forms disclosed herein. This disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles. Further where considered appropriate, reference numerals may be repeated among the drawings to indicate corresponding or analogous elements. Moreover, two or more blocks or elements depicted as distinct or separate in the drawings may be combined into a single functional block or element. Similarly, a single block or element illustrated in the drawings may be implemented as multiple steps or by multiple elements in cooperation. The forms disclosed herein are illustrated by way of example, and not by way of limitation, in the figures of the accompanying drawings and in which like reference numerals refer to similar elements and in which:

DETAILED DESCRIPTION

Terminology

Figure 1:
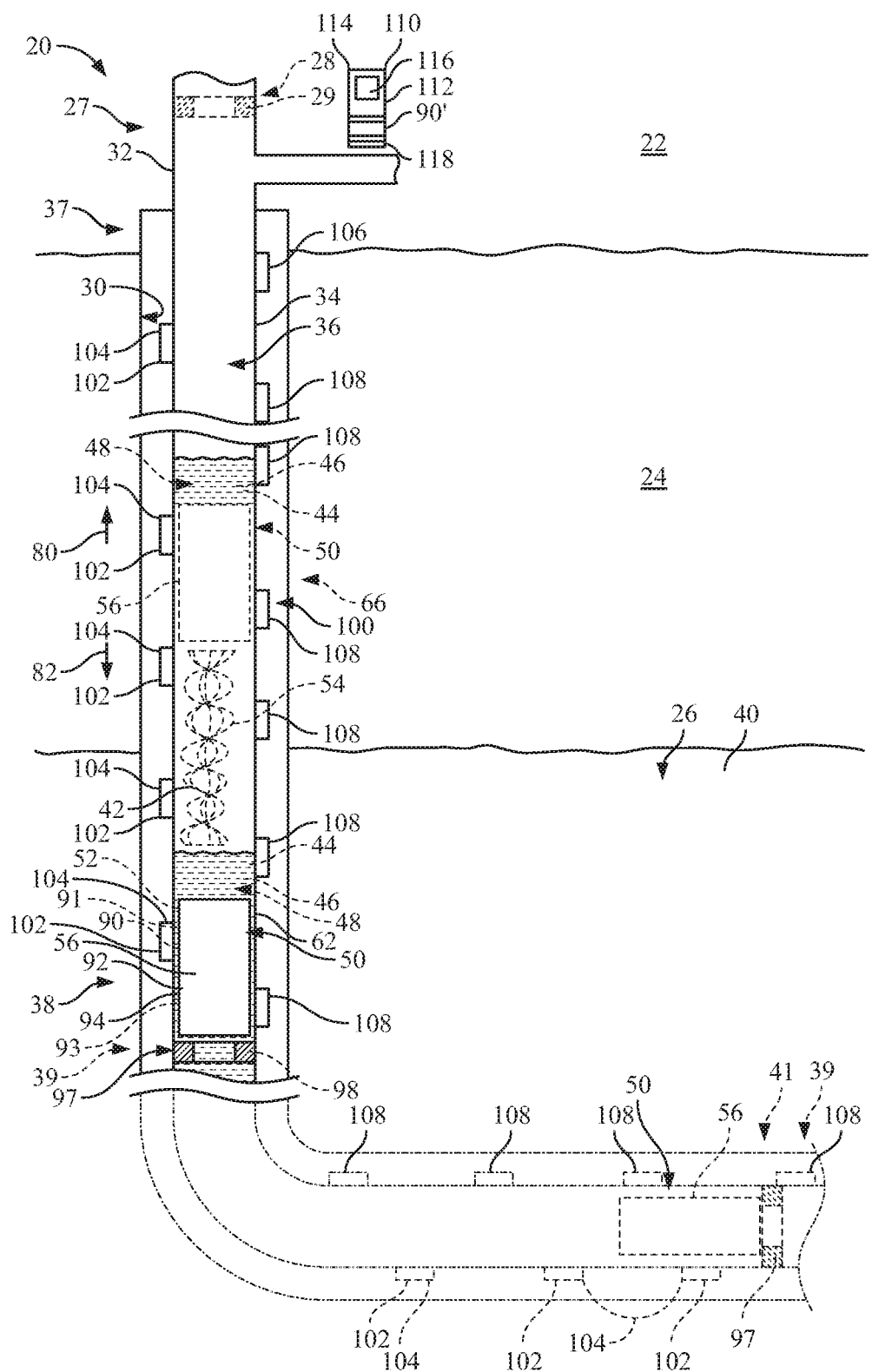
FIG. 1 presents a cross-sectional view of a real-time system for monitoring plunger properties in a gas producing well, in accordance with an embodiment of the disclosure.

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than the broadest meaning understood by skilled artisans, such a special or clarifying definition will be expressly set forth in the specification in a definitional manner that provides the special or clarifying definition for the term or phrase.

For example, the following discussion contains a non-exhaustive list of definitions of several specific terms used in this disclosure (other terms may be defined or clarified in a definitional manner elsewhere herein). These definitions are intended to clarify the meanings of the terms used herein. It is believed that the terms are used in a manner consistent with their ordinary meaning, but the definitions are nonetheless specified here for clarity.

A/an: The articles "a" and "an" as used herein mean one or more when applied to any feature in embodiments and implementations of the present invention described in the specification and claims. The use of "a" and "an" does not limit the meaning to a single feature unless such a limit is specifically stated. The term "a" or "an" entity refers to one or more of that entity. As such, the terms "a" (or "an"), "one or more" and "at least one" can be used interchangeably herein.

About: As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussion below regarding ranges and numerical data.

Above/below: In the following description of the representative embodiments of the invention, directional terms, such as "above", "below", "upper", "lower", etc., are used for convenience in referring to the accompanying drawings. In general, "above", "upper", "upward" and similar terms refer to a direction toward the earth's surface along a wellbore, and "below", "lower", "downward" and similar terms refer to a direction away from the earth's surface along the wellbore. Continuing with the example of relative directions in a wellbore, "upper" and "lower" may also refer to relative positions along the longitudinal dimension of a wellbore rather than relative to the surface, such as in describing both vertical and horizontal wells.

And/or: The term "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined. Other elements may optionally be present other than the elements specifically identified by the "and/or"

clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements). As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of".

Any: The adjective "any" means one, some, or all indiscriminately of whatever quantity.

At least: As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements). The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Based on: "Based on" does not mean "based only on", unless expressly specified otherwise. In other words, the phrase "based on" describes both "based only on," "based at least on," and "based at least in part on."

Comprising: In the claims, as well as in the specification, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Couple: Any use of any form of the terms "connect", "engage", "couple", "attach", or any other term describing an interaction between elements is not meant to limit the interaction to direct interaction between the elements and may also include indirect interaction between the elements described.

Determining: "Determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

Embodiments: Reference throughout the specification to "one embodiment," "an embodiment," "some embodiments," "one aspect," "an aspect," "some aspects," "some implementations," "one implementation," "an implementation," or similar construction means that a particular component, feature, structure, method, or characteristic described in connection with the embodiment, aspect, or implementation is included in at least one embodiment and/or implementation of the claimed subject matter. Thus, the appearance of the phrases "in one embodiment" or "in an embodiment" or "in some embodiments" (or "aspects" or "implementations") in various places throughout the specification are not necessarily all referring to the same embodiment and/or implementation. Furthermore, the particular features, structures, methods, or characteristics may be combined in any suitable manner in one or more embodiments or implementations.

Exemplary: "Exemplary" is used exclusively herein to mean "serving as an example, instance, or illustration." Any embodiment described herein as "exemplary" is not necessarily to be construed as preferred or advantageous over other embodiments.

Flow diagram: Exemplary methods may be better appreciated with reference to flow diagrams or flow charts. While for purposes of simplicity of explanation, the illustrated methods are shown and described as a series of blocks, it is to be appreciated that the methods are not limited by the order of the blocks, as in different embodiments some blocks may occur in different orders and/or concurrently with other blocks from that shown and described. Moreover, less than all the illustrated blocks may be required to implement an exemplary method. In some examples, blocks may be combined, may be separated into multiple components, may employ additional blocks, and so on. In some examples, blocks may be implemented in logic. In other examples, processing blocks may represent functions and/or actions performed by functionally equivalent circuits (e.g., an analog circuit, a digital signal processor circuit, an application specific integrated circuit (ASIC)), or other logic device. Blocks may represent executable instructions that cause a computer, processor, and/or logic device to respond, to perform an action(s), to change states, and/or to make decisions. While the figures illustrate various actions occurring in serial, it is to be appreciated that in some examples various actions could occur concurrently, substantially in parallel, and/or at substantially different points in time. In some examples, methods may be implemented as processor executable instructions. Thus, a machine-readable medium may store processor executable instructions that if executed by a machine (e.g., processor) cause the machine to perform a method.

Full-physics: As used herein, the term "full-physics," "full physics computational simulation," or "full physics simulation" refers to a mathematical algorithm based on first principles that impact the pertinent response of the simulated system.

May: Note that the word "may" is used throughout this application in a permissive sense (i.e., having the potential to, being able to), not a mandatory sense (i.e., must).

Operatively connected and/or coupled: Operatively connected and/or coupled means directly or indirectly connected for transmitting or conducting information, force, energy, or matter.

Optimizing: The terms "optimal," "optimizing," "optimize," "optimality," "optimization" (as well as derivatives and other forms of those terms and linguistically related words and phrases), as used herein, are not intended to be limiting in the sense of requiring the present invention to find the best solution or to make the best decision. Although a mathematically optimal solution may in fact arrive at the best of all mathematically available possibilities, real-world embodiments of optimization routines, methods, models, and processes may work towards such a goal without ever actually achieving perfection. Accordingly, one of ordinary skill in the art having benefit of the present disclosure will appreciate that these terms, in the context of the scope of the present invention, are more general. The terms may describe one or more of: 1) working towards a solution which may be the best available solution, a preferred solution, or a solution that offers a specific benefit within a range of constraints; 2) continually improving; 3) refining; 4) searching for a high point or a maximum for an objective; 5) processing to reduce a penalty function; 6) seeking to maximize one or more factors in light of competing and/or cooperative interests in maximizing, minimizing, or otherwise controlling one or more other factors, etc.

Order of steps: It should also be understood that, unless clearly indicated to the contrary, in any methods claimed herein that include more than one step or act, the order of the steps or acts of the method is not necessarily limited to the order in which the steps or acts of the method are recited.

Ranges: Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of about 1 to about 200 should be interpreted to include not only the explicitly recited limits of 1 and about 200, but also to include individual sizes such as 2, 3, 4, etc. and sub-ranges such as 10 to 50, 20 to 100, etc. Similarly, it should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

Description

Specific forms will now be described further by way of example. While the following examples demonstrate certain forms of the subject matter disclosed herein, they are not to be interpreted as limiting the scope thereof, but rather as contributing to a complete description.

Referring now to FIG. 1, a schematic cross-sectional view of illustrative, non-exclusive examples of a gas producing well 20 that may include and/or utilize a real-time system for monitoring plunger properties in a gas producing well 100, according to the present disclosure. Gas producing well 20 also may be referred to herein as a hydrocarbon well 20 and/or simply as a well 20. Well 20 includes a wellbore 30 that extends between a surface region 22 and a subterranean formation 26 that is present within a subsurface region 24. Well 20 further includes a tubular body 34 that defines a wellbore conduit 36. The wellbore conduit 36 extends within the wellbore 30, is defined within the wellbore 30, and/or includes at least a portion of the wellbore 30.

A plunger 50 is positionable within a target region 38 of wellbore conduit 36. Target region 38 of wellbore conduit 36 may include and/or be any suitable portion of the wellbore conduit that is located downhole from a surface tree 27, that is located and/or defined within subsurface region 24, that is located and/or defined within subterranean formation 26, and/or in which liquid 44 collects. As illustrative, non-exclusive examples, target region 38 may include, be located within, and/or be defined within a portion of subsurface region 24 that provides the wellbore fluid stream to the wellbore conduit and/or within a portion of the wellbore conduit that is distal from an uphole end of the wellbore conduit.

As another illustrative, non-exclusive example, target region 38 may be at least a threshold distance from surface region 22 along a length of wellbore 30. Illustrative, non-exclusive examples of the threshold distance include threshold distances of at least 100 meters (m), at least 250 m, at least 500 m, at least 750 m, at least 1,000 m, at least 1,250 m, at least 1,500 m, at least 2,000 m, at least 3,000 m, at least 4,000 m, at least 5,000 m, at least 7,500 m, or at least 10,000 m.

Plunger 50 may be configured to rest, reside, remain and/or be located within target region 38 of wellbore conduit 36. The plunger 50 may be conveyed within wellbore conduit 36 in uphole direction 80, as illustrated in dashed lines in FIG. 1, by and/or with wellbore fluid stream 42. This enables plunger 50 to urge and/or convey a liquid 44 and/or a solid material 46, which may be present within wellbore conduit 36, in the uphole direction. This conveying may thereby permit removal of the liquid 44 and/or the solid material 46 from the wellbore conduit and/or decrease a resistance to the flow of wellbore fluid stream 42 from the subterranean formation, within the wellbore conduit, in the uphole direction, and/or from the gaseous hydrocarbon well 20.

Subsequent to being conveyed in uphole direction 80, plunger 50 may be stored within a plunger lubricator 32 of tree 27. When conditions dictate, the well 20 may be shut in and plunger 50 permitted to fall, such as under the influence of gravity, in a downhole direction 82 and/or toward target region 38 within wellbore conduit 36. The plunger 50 then may rest, reside, remain and/or be located within the target region 38 of the wellbore conduit 36, such as for at least a period of time, before once again being conveyed in uphole direction 80 by wellbore fluid stream 42. This process may be repeated any suitable number of times and/or with any suitable frequency to remove liquid 44 and/or solid material 46 from the wellbore conduit 36.

Wellbore conduit 36 may be defined by any suitable structure and/or tubular body 34. As an illustrative, non-exclusive example, wellbore conduit 36 may be defined by tubular body 34. As another illustrative, non-exclusive example, wellbore conduit 36 may be defined by (or tubular body 34 may be) a casing string that extends within wellbore 30. As yet another illustrative, non-exclusive example, wellbore conduit 36 may be defined by (or tubular body 34 may be) a tubing or production string that extends within wellbore 30.

As illustrated in solid lines in FIG. 1, wellbore 30 may include and/or be a vertical, or at least substantially vertical, wellbore 30 (or wellbore conduit 36 may include and/or be a vertical, or at least substantially vertical, wellbore conduit 36). However, and as illustrated in dash-dot lines in FIG. 1, wellbore 30 (or wellbore conduit 36) also may include and/or define one or more horizontal and/or deviated regions. As further illustrated in FIG. 1, target region 38 may be located in any suitable portion of wellbore conduit 36, including a vertical portion, a deviated portion, and/or a horizontal portion of the wellbore conduit. Target region 38 may located within a deviated and/or horizontal portion of wellbore conduit 36 and plunger 50 may be conveyed in downhole direction 82 thereto.

As may be appreciated, target region 38 of wellbore conduit 36 may include and/or be any suitable portion of the wellbore conduit that is located downhole from surface tree 27, that is located and/or defined within subsurface region 24, that is located and/or defined within subterranean formation 26, and/or in which liquid 44 collects. As illustrative, non-exclusive examples, target region 38 may include, be located within, and/or be defined within a portion of subsurface region 24 that provides the wellbore fluid stream to the wellbore conduit and/or within a portion of the wellbore conduit that is distal from an uphole end of the wellbore conduit. As another illustrative, non-exclusive example, target region 38 may be at least a threshold distance from surface region 22 along a length of wellbore 30. Illustrative, non-exclusive examples of the threshold distance include threshold distances of at least 100 meters (m), at least 250 m, at least 500 m, at least 750 m, at least 1,000 m, at least 1,250 m, at least 1,500 m, at least 2,000 m, at least 3,000 m, at least 4,000 m, at least 5,000 m, at least 7,500 m, or at least 10,000 m.

As illustrated in FIG. 1, well 20 further may include a downhole support structure 97. Downhole support structure 97 may be configured to support, locate, and/or retain plunger 50 when the plunger is located within target region 38 of wellbore conduit 36. Should plunger 50 be provided with downhole electronics, plunger 50 may include a power source 94, such as a battery. Under these conditions, downhole support structure 97 may include a downhole electrical connection 98 that is configured to provide an electric current to power source 94, such as to charge the power source. Plunger 50 may also include a detector 92 that is configured to detect variables that may be representative of conditions proximal to plunger 50 within wellbore conduit 36.

Well 20 also may include an uphole support structure 28. Uphole support structure 28 which may be associated with, near, and/or proximal to an uphole end of wellbore 36, may be associated with, near, and/or proximal to a surface tree 27 that is associated with well 20 and/or that is configured to selectively regulate flow of wellbore fluid stream 42 from well 20. As a further example, uphole support structure 28 may be located within a lubricator 32 of surface tree 27. Similar to downhole support structure 97, uphole support structure 28 may include an uphole electrical connection 29, which may be at least substantially similar to downhole electrical connection 98. When plunger 50 is conveyed in uphole direction 80, near surface region 22, into surface tree 27, and/or into contact with uphole support structure 28, the plunger may be retained on uphole support structure 28 to permit charging of power source 94.

Wellbore fluid stream 42 may include any wellbore fluid 40 that may flow from subterranean formation 26, may flow through wellbore conduit 36, and/or may be produced from gaseous hydrocarbon well 20. Generally, wellbore fluid stream 42 will include and/or be a gaseous stream and/or a vaporous stream, and illustrative, non-exclusive examples of wellbore fluid stream 42 include a gaseous hydrocarbon stream, a vaporous hydrocarbon stream, a methane stream, and/or a natural gas stream.

Liquid 44 may include any liquid that may accumulate within wellbore conduit 36, may be present within wellbore conduit 36, and/or may (at least partially) restrict flow of wellbore fluid stream 42 within wellbore conduit 36. Illustrative, non-exclusive examples of liquid 44 include water and/or a liquid hydrocarbon. Solid material 46 may include any solid, solid-like, and/or gel material that may accumulate within wellbore conduit 36, may be present within wellbore conduit 36, and/or may (at least partially) restrict flow of wellbore fluid stream 42 within wellbore conduit 36. Illustrative, non-exclusive examples of solid material 46 include a paraffin, a wax, and/or scale. Liquid 44 and/or solid material 46 present in wellbore conduit 36 generally may be referred to herein as wellbore material 48.

As used herein, uphole direction 80 may include any direction that is along (or parallel to) a respective length (or portion) of wellbore conduit 36 and that is directed toward, or closer to, an intersection of the wellbore conduit with surface region 22 and/or toward surface tree 27, when present. Additionally or alternatively, moving an object in the uphole direction also may be described as moving the object in a direction along a trajectory of wellbore conduit 36 that tends to decrease a distance between the object and a surface terminal end 37 of wellbore conduit 36.

Conversely, downhole direction 82 may include any direction that is along (or parallel to) the respective length (or portion) of wellbore conduit 36 and that tends to move away from the intersection of the wellbore with surface region 22, away from surface tree 27, away from surface terminal end 37, toward a subterranean terminal end 39 of wellbore conduit 36, and/or toward a toe 41 (when present) of wellbore conduit 36.

Surface tree 27 may include and/or be any suitable structure that may be configured to control and/or regulate at least a portion of the fluid flows into and/or out of well 20. As illustrative, non-exclusive examples, surface tree 27 may include one or more valves, spools, and/or fittings. Surface tree 27 also may be referred to herein as a Christmas tree 27, a surface valve assembly 27, and/or as a surface flow control assembly 27.

Still, referring to FIG. 1, the real-time system for monitoring plunger properties in a gas producing well 100 includes the plunger 50, plunger 50 including a substantially cylindrical body 56; at least one sensor 102 disposed along a tubular body 34; and at least one sensor communications node 104 placed along the tubular body 34 and affixed to a wall 62 of the tubular body 34. The at least one sensor communications node 104 may be operatively connected, structured and arranged or otherwise in electrical communication with the at least one sensor 102 and configured to receive signals therefrom. In some embodiments, the at least one sensor 102 may be positioned on a surface of, or within, the at least one sensor communications node 104.

In some embodiments, the at least one sensor 102 is selected from a plunger position sensor, a plunger wear sensor, plunger velocity sensor, a fluid density sensor, a fluid resistivity sensor, a fluid velocity sensor, a pressure drop sensor or a combination thereof. In some embodiments, the at least one sensor 102 comprises a plurality of sensors 102. In some embodiments, the at least one sensor 102 employs passive acoustic monitoring, electromagnetic signature detection, sonar monitoring, radar monitoring, or radiation monitoring to detect the properties of plunger 50.

The sensor nodes could employ passive acoustic monitoring, electromagnetic signature detection, sonar, radar, radiation sources, and/or other means to detect the properties described above. The data transmitted to surface could be incorporated into the plunger lift control system for richer data collection, exception-based surveillance, autonomous optimization, etc.

The real-time system for monitoring plunger properties in a gas producing well 100 may also include a topside communications node 106 placed proximate a surface or surface region 22. In some embodiments, the topside communications node 106 is configured to receive and/or transmit acoustic signals. The topside communications node 102 can be below grade as shown in FIG. 1, or above grade.

The real-time system for monitoring plunger properties in a gas producing well 100 may also include a plurality of intermediate communications nodes 108 spaced along the tubular body 34 and attached to a wall 62 of the tubular body 34. The intermediate communications nodes 108 are configured to transmit signals received from the at least one sensor communications node 104 to the topside communications node 106 in substantially a node-to-node arrangement.

In some embodiments, one or more of the intermediate communications nodes 108 may be positioned between an at least one sensor communications node 104 and the topside communications node 106. In some embodiments, the intermediate communications nodes 108 are configured to receive and then relay acoustic signals along the length of the wellbore 30. In some embodiments, the intermediate communications nodes 108 utilize separate electro-acoustic transducers to receive and relay mechanical waves. In some embodiments, the intermediate communications nodes 108 utilize two-way electro-acoustic transducers to both receive and relay mechanical waves.

The real-time system for monitoring plunger properties in a gas producing well 100 may also include a receiver 110, which may be positioned at the surface or surface region 22. The receiver 110 may be configured to receive signals from the topside communications node 106 and a plunger lift control system 90, 90'. In some embodiments, the plunger lift control system 90 may reside or be located at or within plunger 50, and is structured and arranged to communicate with the topside communications node 106. In some embodiments, the plunger lift control system 90' may be positioned at the surface or surface region 22 or may reside or be located at or within receiver 110, and is structured and arranged to communicate with the topside communications node 106. In some embodiments, data transmitted topside is utilized by the plunger lift control system 90, 90' for plunger surveillance and optimization.

The receiver 110 includes a processor 112 that receives signals sent from the topside communications node 106. The signals may be received through a wire (not shown) such as a co-axial cable, a fiber optic cable, a USB cable, or other electrical or optical communications wire. Alternatively, the receiver 110 may receive signals from the topside communications node 106 wirelessly through a modem, a transceiver or other wireless communications link. In some embodiments, the receiver 110 receives electrical signals via a so-called Class I, Division 1 conduit, that is, a housing for wiring that is considered acceptably safe in an explosive environment. In some applications, radio, infrared or microwave signals may be utilized.

In some embodiments, the processor 112 may be incorporated into a computer 114 having a screen 116. The computer 114 may have a separate keyboard 118, as is typical for a desk-top computer, or an integral keyboard as is typical for a laptop or a personal digital assistant. In one aspect, the processor 112 is part of a multi-purpose "smart phone" having specific applications and wireless connectivity.

Data may be sent along the nodes, not only from the at least one sensor 102 up to the receiver 110, but also from the receiver 110 down to the at least one sensor 102. This transmission may be of benefit in the event that the operator wishes to make a change in the operations. This is also of benefit when the at least one sensor 102 is actually another type of device, such as an inflow control device that opens, closes or otherwise actuates in response to a signal from the surface or surface region 22.

Figure 2:
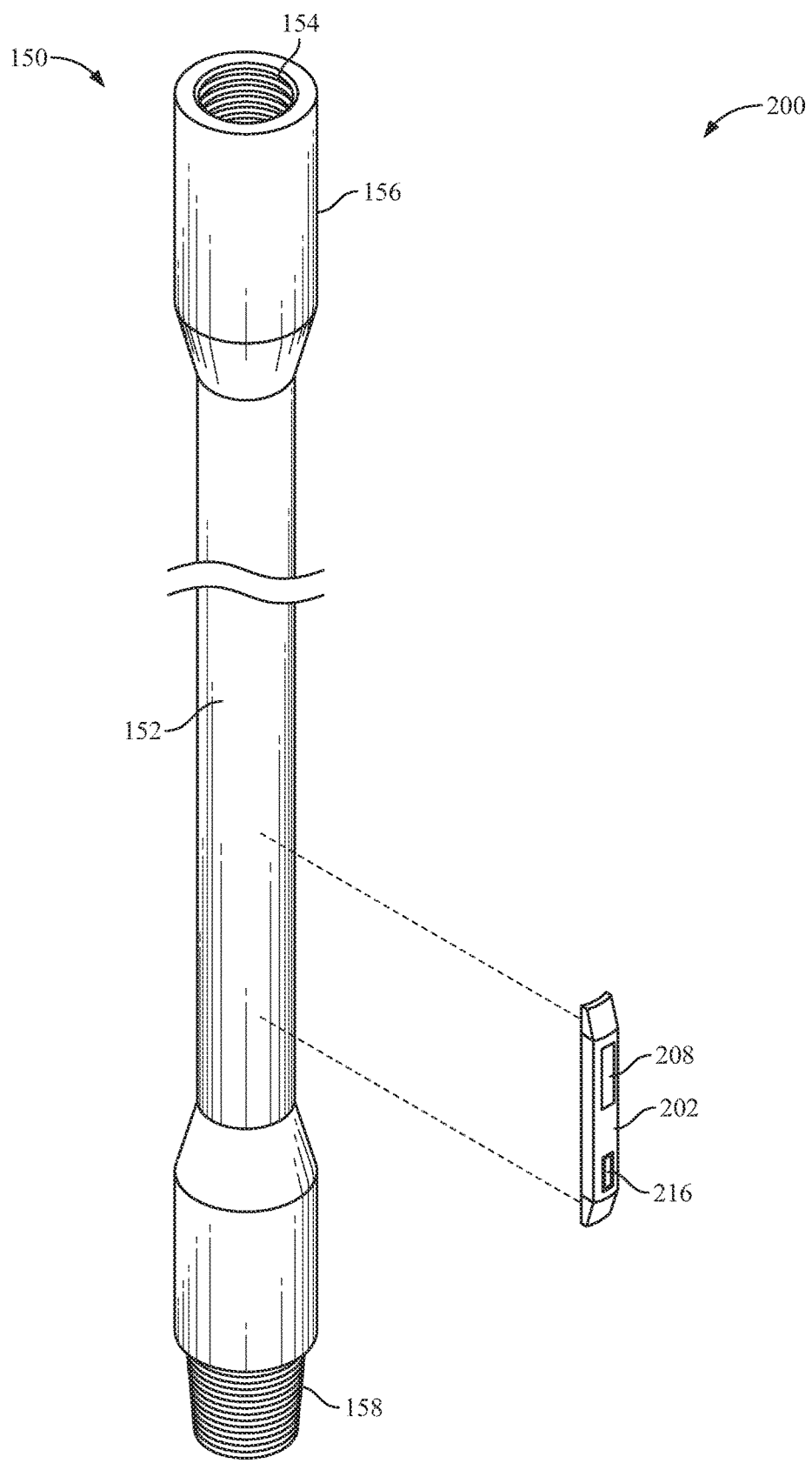
FIG. 2 presents a perspective view of an illustrative tubular section of a real-time system for monitoring plunger properties, in accordance with an embodiment of the disclosure. An intermediate communications node in accordance herewith, is shown in exploded form away from the tubular section.

As may be appreciated, in FIG. 1, the at least one sensor communications node 104 and the plurality of intermediate communications nodes 108 are shown schematically. Referring now to FIG. 2, an enlarged perspective view of an illustrative tubular section 150 of a tubular body 34, along with an illustrative intermediate communications node 200. The illustrative intermediate communications node 200 is shown exploded away from the tubular section 150. The tubular section 150 has an elongated wall 152 defining an internal bore 154. The tubular section 150 has a box end 156 having internal threads, and a pin end 158 having external threads.

As noted, the illustrative intermediate communications node 200 is shown exploded away from the tubular section 150. The intermediate communications node 200 is structured and arranged to attach to the wall 152 of the tubular section 150 at a selected location. In one aspect, selected tubular sections 150 will each have an intermediate communications node 200 between the box end 156 and the pin end 158. In one arrangement, the intermediate communications node 200 is placed immediately adjacent the box end 156 or, alternatively, immediately adjacent the pin end 158 of every tubular section 150. In another arrangement, the intermediate communications node 200 is placed at a selected location along every second or every third tubular section 150. In other aspects, more or less than one intermediate communications node 200 may be placed per tubular section 150.

In some embodiments, the intermediate communications node 200 shown in FIG. 2 is designed to be pre-welded onto the wall 152 of the tubular section 150. In some embodiments, intermediate communications node 200 is configured to be selectively attachable to/detachable from a intermediate by mechanical means at a well 20. This may be done, for example, through the use of clamps (not shown). Alternatively, an epoxy or other suitable acoustic couplant may be used for chemical bonding. In any instance, the intermediate communications node 200 is an independent wireless communications device that is designed to be attached to an external surface of a tubular.

There are benefits to the use of an externally-placed communications node that uses acoustic waves. For example, such a node will not interfere with the flow of fluids within the internal bore 154 of the tubular section 150. Further, installation and mechanical attachment can be readily assessed or adjusted, as necessary.

As shown in FIG. 2, the intermediate communications node 200 includes a housing 202. The housing 202 supports a power source residing within the housing, which may be one or more batteries, as shown schematically at 208. The housing 202 also supports an electro-acoustic transducer, shown schematically at 216. In some embodiments, the electro-acoustic transducer 216 may be a two-way transceiver that can both receive and transmit acoustic signals. The intermediate communications node 200 is intended to represent the plurality of intermediate communications nodes 108 of FIG. 1, in one embodiment. The two-way electro-acoustic transducer 216 in each intermediate communications node 200 allows acoustic signals to be sent from node-to-node, either up the wellbore 20 or down the wellbore 20. Where the tubular section 150 is formed of carbon steel, such as a casing or liner, the housing 202 is preferably fabricated from carbon steel. This metallurgical match avoids galvanic corrosion at the coupling.

Figure 3:
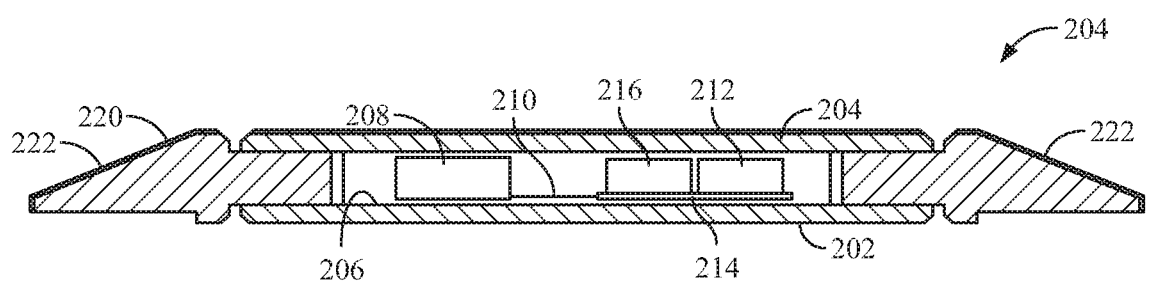
FIG. 3 presents a cross-sectional view of the intermediate communications node of FIG. 2. The view is taken along the longitudinal axis of the intermediate communications node.

FIG. 3 provides a cross-sectional view of the intermediate communications node 200 of FIG. 2. The view is taken along the longitudinal axis of the intermediate communications node 200. The housing 202 is dimensioned to be strong enough to protect internal electronics. In one aspect, the housing 202 has an outer wall 204 that may be about 0.2 inches (0.51 cm) in thickness. A cavity 206 houses the electronics, including, by way of example and not of limitation, a battery 208, a power supply wire 210, a transceiver 212, and a circuit board 214. The circuit board 214 will preferably include a micro-processor or electronics module that processes acoustic signals. An electro-acoustic transducer 216 is provided to convert acoustical energy to electrical energy (or vice-versa) and is coupled with outer wall 204 on the side attached to the tubular body.

Figure 4:
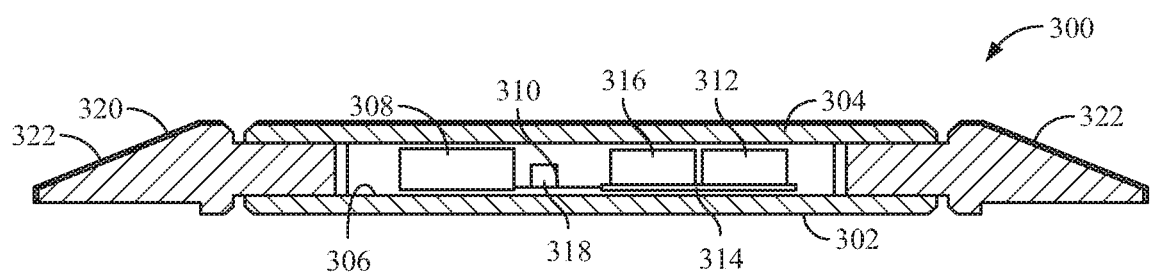
FIG. 4 is a cross-sectional view of an illustrative embodiment of a sensor communications node having a sensor positioned within the sensor communications node. The view is taken along the longitudinal axis of the sensor communications node.

FIG. 4 provides a cross-sectional view of a sensor communications node 300. The sensor communications node 300 is intended to represent the plurality of sensor communications nodes 104 of FIG. 1, in one embodiment. The view is taken along the longitudinal axis of the sensor communications node 300. The sensor communications node 300 includes a housing 302. As with the housing 202 of intermediate communications node 200, the housing 302 is structured and arranged to be attached to an outer wall of a tubular section, such as the tubular section 150 of FIG. 2. Where the tubular section is formed of a carbon steel, such as a casing or liner, the housing 302 is preferably fabricated from carbon steel. This metallurgical match avoids galvanic corrosion at the coupling.

The housing 302 is dimensioned to be strong enough to protect internal electronics. In one aspect, the housing 302 has an outer wall 304 that may be about 0.2 inches (0.51 cm) in thickness. A cavity 306 houses the electronics, including, by way of example and not of limitation, a battery 308, a power supply wire 310, a transceiver 312, and a circuit board 314. The circuit board 314 will preferably include a microprocessor or electronics module that processes acoustic signals. An electro-acoustic transducer 316 is provided to convert acoustical energy to electrical energy (or vice-versa) and is coupled with outer wall 304 on the side attached to the tubular body. The transducer 316 is in electrical communication with at least one sensor 318, which may be the at least one sensor 102 of FIG. 1, in one embodiment.

Figure 5:
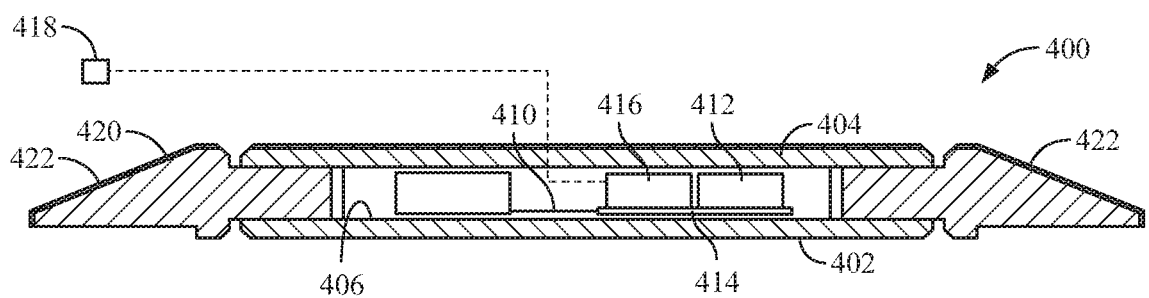
FIG. 5 is another cross-sectional view of an illustrative embodiment of a sensor communications node having a sensor positioned along the wellbore external to the sensor communications node. The view is again taken along the longitudinal axis of the sensor communications node.

It is noted that in FIG. 4, the at least one sensor 318 resides within the housing 302 of the sensor communications node 300. Referring now to FIG. 5, an alternate embodiment is presented wherein an at least one sensor 418 is shown to reside external to a sensor communications node 400, such as above or below the sensor communications node 400 along the wellbore. In FIG. 5, the sensor communications node 400 is also intended to represent the plurality of sensor communications nodes 104 of FIG. 1, in one embodiment. The sensor communications node 400 includes a housing 402, which is structured and arranged to be attached to an outer wall of a tubular section, such as the tubular section 150 of FIG. 2.

In one aspect, the housing 402 has an outer wall 404 that may be about 0.2 inches (0.51 cm) in thickness. A cavity 406 houses the electronics, including, by way of example and not of limitation, a battery 408, a power supply wire 410, a transceiver 412, and a circuit board 414. The circuit board 414 will preferably include a micro-processor or electronics module that processes acoustic signals. An electro-acoustic transducer 416 is provided to convert acoustical energy to electrical energy (or vice-versa) and is coupled with outer wall 404 on the side attached to the tubular body. The transducer 416 is in electrical communication with at least one sensor 418. A dashed line is provided showing an extended connection between the at least one sensor 418 and the electro-acoustic transducer 416.

Referring now to FIGS. 1-5, in some embodiments, the intermediate communications nodes 108 or 200 may also serve as sensor communications nodes 104, 300 or 400. This may be accomplished by having a sensor 102, 318 or 418 communicate directly with intermediate communications nodes 108 or 200, rather than with sensor communications nodes 104, 300 or 400, some or all of which can then be eliminated. Suitable circuitry to accomplish this task may be included in circuit board 214 or elsewhere within the housing 202.

As may be appreciated by those skilled in the art, in some embodiments, the transceiver 212 of intermediate communications nodes 200 and/or the transceivers 312 and 412 of the sensor communications nodes 300 or 400 may be replaced by separate transmitters and receivers.

In some embodiments, the plurality of intermediate communications nodes 108, 200 are configured to transmit acoustic waves, radio waves, low frequency electromagnetic waves, inductive electromagnetic waves, light, or combinations thereof. In some embodiments, the at least one sensor communications node 104, 300, 400 is configured to transmit acoustic waves, radio waves, low frequency electromagnetic waves, inductive electromagnetic waves, light, or combinations thereof. In some embodiments, the plurality of intermediate communications nodes 108, 200 and the at least one sensor communications node 104, 300, 400 are configured to transmit acoustic waves, providing real-time plunger lift information to the plunger control system.

In some embodiments, the acoustic telemetry data transfer is accomplished using multiple frequency shift keying (MFSK). Any extraneous noise in the signal is moderated by using well-known analog and/or digital signal processing methods. This noise removal and signal enhancement may involve conveying the acoustic signal through a signal conditioning circuit using, for example, a bandpass filter.

In some embodiments, the transceiver 212 of intermediate communications nodes 200, the transceivers 312 and 412 of the sensor communications nodes 300 or 400, or the separate transmitters, may also produce acoustic telemetry signals. In some embodiments, an electrical signal is delivered to an electromechanical transducer, such as through a driver circuit.

In some embodiments, the acoustic waves represent asynchronous packets of information comprising a plurality of separate tones, with at least some of the acoustic waves being indicative of a property of the plunger.

In some embodiments, the transceiver 212 of intermediate communications nodes 200, the transceivers 312 and 412 of the sensor communications nodes 300 or 400 is the same electro-acoustic transducer that originally received the MFSK data. The signal generated by the electro-acoustic transducer then passes through the housing 202, 302 or 402 to the tubular body 34, and propagates along the tubular body 34 to other intermediate communications nodes 200. The re-transmitted signal represents the same sensor data originally transmitted by sensor communications nodes 300 or 400. In one aspect, the acoustic signal is generated and received by a magnetostrictive transducer comprising a coil wrapped around a core as the transceiver. In another aspect, the acoustic signal is generated and received by a piezo-electric ceramic transducer. In either case, the electrically encoded data are transformed into a sonic wave that is carried through the wall of the tubular body 34 in the wellbore.

In some embodiments, the intermediate communications nodes 200, and the sensor communications nodes 300, 400 may also be provided with a protective outer layer 220, 320, 420. The protective outer layer 220, 320, 420 resides external to the wall 204, 304, 404 and provides an additional thin layer of protection for the electronics. The intermediate communications nodes 200, and the sensor communications nodes 300, 400 may also be fluid sealed with the housing 410 to protect the internal electronics. Additional protection for the internal electronics is available using an optional potting material.

In some embodiments, the intermediate communications nodes 200, and the sensor communications nodes 300, 400 may also optionally include a shoe 222, 322, 422. More specifically, the intermediate communications nodes 200, and the sensor communications nodes 300, 400 may include a pair of shoes 222, 322, 422 disposed at opposing ends of the wall 204, 304, 404. Each of the shoes 222, 322, 422 provides a beveled face that helps prevent the node 400 from hanging up on an external tubular body or the surrounding earth formation, as the case may be, during run-in or pull-out. The shoes 222, 322, 422 may also have an optional cushioning material (not shown) under the outer layer 422.

Referring again to FIG. 1, as indicated above, in some embodiments, the plunger 50 may include a plunger lift control system 90, which may be in communication with a detector 92. In addition, plunger 50 may include a transmitter 91 and/or a receiver 93. Transmitter 91 and/or receiver 93 may permit plunger lift control system 90 to transmit and/or receive data or relevant signals.

It is within the scope of the present disclosure that plunger 50 and/or plunger lift control system 90 thereof may be adapted, configured, designed, and/or programmed to release, or regulate a release of, supplemental material 54 into wellbore conduit 36. As an illustrative, non-exclusive example, plunger 50 may include a supplemental material reservoir 52, and controller 90 may direct plunger 50 to release supplemental material 54 from supplemental material reservoir 52 and into the wellbore conduit. As a further illustrative, non-exclusive example, controller 90 may signal supplemental material 54 to be released into wellbore conduit 36 from surface region 22. Illustrative, non-exclusive examples of supplemental material 54 include any suitable foaming agent, soap, surfactant, lubricant, and/or mixtures thereof. Additional illustrative, non-exclusive examples of supplemental material 54 include inhibitors, such as a scale inhibitor, corrosion inhibitor, paraffin inhibitor, etc.

Figure 6:
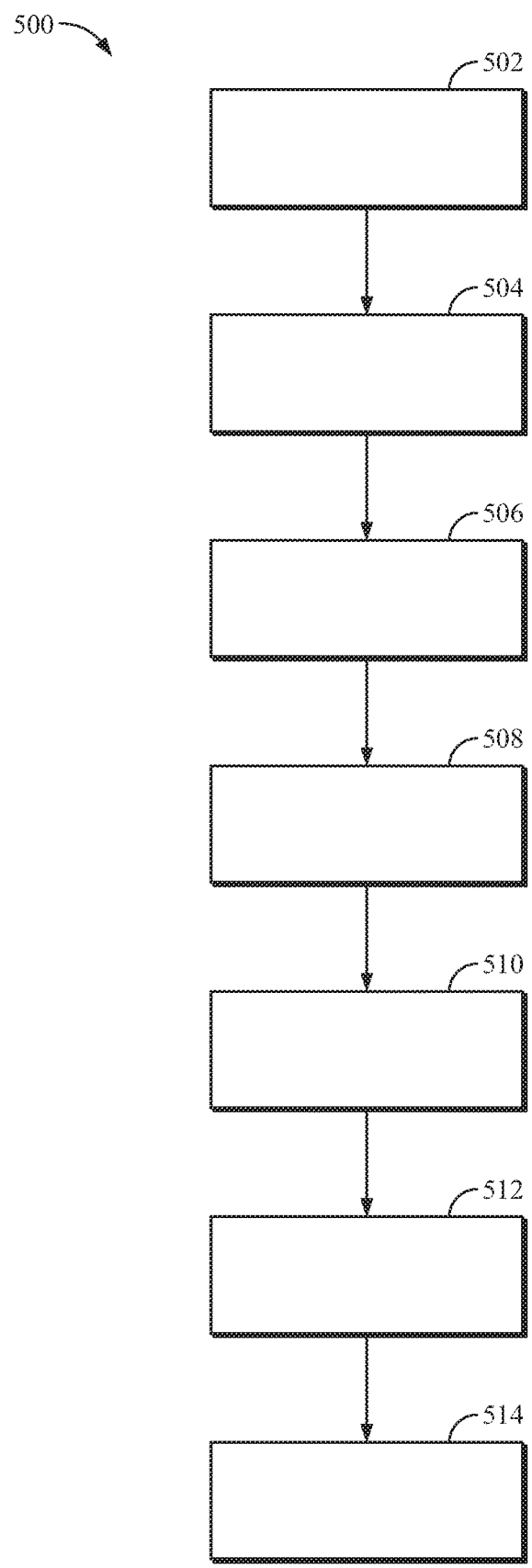
FIG. 6 is a flowchart of an exemplary method of monitoring plunger properties and controlling plunger performance in a gas producing well, in accordance with an embodiment of the disclosure.

Referring now to FIG. 6, a method of monitoring plunger properties and controlling plunger performance in a gas producing well 500 is provided. The method includes 502, sending a plunger responsive to pressure changes into the gas producing well; 504, sensing one or more plunger properties via one or more sensors positioned along the tubular body; 506, receiving signals from the one or more sensors; 508, transmitting those signals via a transmitter to an intermediate communications node attached to a wall of the tubular body; 510, transmitting signals received by the intermediate communications node to at least one additional intermediate communications node via a transmitter; 512, transmitting signals received by the intermediate communications node to a topside communications node via a transmitter; and 514, controlling plunger performance to minimize hydrostatic pressure within the tubular body in response to signals received from the topside communications node.

In some embodiments, the intermediate communications nodes are configured to transmit acoustic waves, radio waves, low frequency electromagnetic waves, inductive electromagnetic waves, light, or combinations thereof.

In some embodiments, the step of transmitting the signals received from the one or more sensors via a transmitter employs at least one sensor communications node configured to transmit acoustic waves, radio waves, low frequency electromagnetic waves, inductive electromagnetic waves, light, or combinations thereof.

In some embodiments, the intermediate communications nodes and the at least one sensor communications node are configured to transmit acoustic waves, providing real-time plunger lift information to a plunger control system.

In some embodiments, each of the intermediate communications nodes comprises: a sealed housing; a power source residing within the housing; and an electro-acoustic transducer. In some embodiments, each of the intermediate communications nodes further comprises a transceiver or a separate transmitter and receiver associated with the electro-acoustic transducer structured and arranged to receive and re-transmit the acoustic waves.

In some embodiments, the at least one sensor communications node comprises: a sealed housing; a power source residing within the housing; and an electro-acoustic transducer. In some embodiments, the at least one sensor communications node further comprises a transceiver or a separate transmitter and receiver associated with the electro-acoustic transducer that is structured and arranged to communicate with the at least one sensor and transmit acoustic waves in response thereto.

In some embodiments, the acoustic waves represent asynchronous packets of information comprising a plurality of separate tones, with at least some of the acoustic waves being indicative of a property of the plunger.

In some embodiments, the one or more sensors are selected from a plunger position sensor, a plunger wear sensor, plunger velocity sensor, a fluid density sensor, a fluid resistivity sensor, a fluid velocity sensor, a pressure drop sensor or a combination thereof.

As may be appreciated, the aforementioned sensors and the systems and methods employing same, enable the detection of several parameters that are indicative of plunger lift performance including, but not limited to, plunger velocity, plunger wear and various downhole fluid properties.

Downhole plunger velocity and plunger location, are unknown with existing surveillance technologies. Instead, an average plunger speed is determined using a plunger arrival sensor and drop/receive cycle times. The system and methods disclosed herein provide more accurate knowledge of the plunger velocity, enabling plunger lift performance optimization. As a safety enhancement, plunger velocity information obtained as the plunger approaches the surface permits measures to be taken (e.g., wellhead valve closure) to prevent a potentially catastrophic collision in the lubricator if a plunger surfaces with excessive force (a dry trip). A runaway plunger can approach speeds of over 2500 ft/min, which should still be slower than the communication time of the downhole wireless networks disclosed herein. The more accurate knowledge of plunger location provided by the system and methods disclosed herein would help the operator of the well to ensure that the plunger was making an appropriate number of trips per day and would help determine whether and/or where a plunger had stalled-out.

With regard to plunger wear, the ability to track total plunger material loss over time helps to ensure that the plunger is replaced at appropriate maintenance intervals. This information is currently obtained by pulling a plunger from the well and inspecting it, which certainly entails an element of risk. While some attempts have been made to gauge plunger wear from degradation of plunger performance, the additional downhole information provided serves to improve these efforts. The measurement of fluid density, fluid resistivity, fluid velocity, and/or pressure drop across the tubing enables optimization in plunger selection, operation, and maintenance.

Illustrative, non-exclusive examples of systems and methods according to the present disclosure have been presented. It is within the scope of the present disclosure that an individual step of a method recited herein, including in the following enumerated paragraphs, may additionally or alternatively be referred to as a "step for" performing the recited action.

INDUSTRIAL APPLICABILITY

The apparatus and methods disclosed herein are applicable to the oil and gas industry.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A real-time system for monitoring plunger properties in a gas producing well, comprising:
   at least one sensor disposed along a tubular body;
   a plunger located and conveyed within the tubular body, the plunger comprising a
   substantially cylindrical body;
   at least one sensor communications node placed along the tubular body and affixed to a wall of the tubular body, the sensor communications node being in electrical communication with the at least one sensor and configured to receive signals therefrom;
   a topside communications node placed proximate a surface;
   a plurality of intermiediate communications nodes spaced along the tubular body and attached to the wall of the tubular body; wherein the intermediate communications nodes are configured to acoustically transmit signals received from the at least one sensor communications node to the topside communications node in substantially a node-to-node arrangement, wherein the acoustically transmitted signals are propagated along the tubular body between adjacent intermediate communications nodes;
   a receiver at the surface configured to receive signals from the topside communications node; and
   a plunger control system structured and arranged to communicate with the topside communications node.

2. The system of claim 1, wherein the plurality of intermediate communications nodes are configured to transmit acoustic waves in combination with one or more of radio waves, low frequency electromagnetic waves, inductive electromagnetic waves, or light.

3. The system of claim 1, wherein the at least one sensor communications node is configured to transmit acoustic waves, radio waves, low frequency electromagnetic waves, inductive electromagnetic waves, light, or combinations thereof.

4. The system of claim 3, wherein the plurality of intermediate communications nodes and the at least one sensor communications node are configured to transmit acoustic waves, providing real-time plunger lift information to the plunger control system.

5. The system of claim 4, wherein each of the plurality of intermediate communications nodes comprises: a sealed housing; a power source residing within the housing; and an electro-acoustic transducer.

6. The system of claim 5, wherein each of the plurality of intermediate communications nodes further comprises a transceiver or a separate transmitter and receiver associated with the electro-acoustic transducer structured and arranged to receive and re-transmit the acoustic waves.

7. The system of claim 6, wherein the a east one sensor communications node comprises: a sealed housing; a power source residing within the housing; and an electro-acoustic transducer.

8. The system of claim 7, wherein the at least one sensor communications node further comprises a transceiver or a separate transmitter and receiver associated with the electro-acoustic transducer that is structured and arranged to communicate with the at least one sensor and transmit acoustic waves in response thereto.

9. The system of claim 8, wherein the acoustic waves represent asynchronous packets of information comprising a plurality of separate tones, with at least some of the acoustic waves being indicative of a property of the plunger.

10. The system of claim 1, wherein the at least one sensor is selected from a plunger position sensor, a plunger wear sensor, plunger velocity sensor, a fluid density sensor, a fluid resistivity sensor, a fluid velocity sensor, a pressure drop sensor or a combination thereof.

11. The system of claim 1, wherein the at least one sensor comprises a plurality of sensors.

12. The system of claim 1, wherein the at least one sensor employs passive acoustic monitoring, electromagnetic signature detection, sonar monitoring, radar monitoring, or radiation monitoring to detect plunger properties.

13. The system of claim 1, wherein data transmitted topside is utilized by the plunger lift control system for plunger surveillance and optimization.

14. A method of monitoring plunger properties and controlling plunger performance in a gas producing well having a tubular body comprising:
sending a plunger responsive to pressure changes into the gas producing well and within
the tubular body;
sensing one or more plunger properties via one or more sensors positioned along the tubular body;
receiving signals from the one or more sensors;
transmitting those signals via a transmitter to an intermediate communications node attached to a wall of the tubular body;
acoustically transmitting signals received by the intermediate communications node to at least one additional intermediate communications node via a transmitter associated with the intermediate communications node, wherein the acoustically transmitted signals are propagated along the tubular body between adjacent intermediate communications nodes;
transmitting signals received by one of the at least one additional intermediate communications node to a topside communications node via a transmitter associated with said one of the at least one additional intermediate communications node; and
controlling plunger performance to minimize hydrostatic pressure within the tubular body in response to signals received from the topside communications node.

15. The method of claim 14, wherein the intermediate communications nodes are configured to transmit acoustic waves in combination with one or more of radio waves, low frequency electromagnetic waves, inductive electromagnetic waves, or light.

16. The method of claim 14, wherein the step of transmitting the signals received from the one or more sensors via a transmitter employs at least one sensor communications node configured to transmit acoustic waves, radio waves, low frequency electromagnetic waves, inductive electromagnetic waves, light, or combinations thereof.

17. The method of claim 16, wherein the intermediate communications nodes and the at least one sensor communications node are configured to transmit acoustic waves, providing real-time plunger lift information to a plunger control system.

18. The method of claim 17, wherein each of the intermediate communications nodes comprises: a sealed housing; a power source residing within the housing; and an electro-acoustic transducer.

19. The method of claim 18, wherein each of the intermediate communications nodes further comprises a transceiver or a separate transmitter and receiver associated with the electro-acoustic transducer structured and arranged to receive and re-transmit the acoustic waves.

20. The method of claim 19, wherein the at least one sensor communications node comprises: a sealed housing; a power source residing within the housing; and an electro-acoustic transducer.

21. The method of claim 20, wherein the at least one sensor communications node further comprises a transceiver or a separate transmitter and receiver associated with the electro-acoustic transducer that is structured and arranged to communicate with the at least one sensor and transmit acoustic waves in response thereto.

22. The method of claim 21, wherein the acoustic waves represent asynchronous packets of information comprising a plurality of separate tones, with at least some of the acoustic waves being indicative of a property of the plunger.

23. The method of claim 14, wherein the one or more sensors are selected from a plunger position sensor, a plunger wear sensor, plunger velocity sensor, a fluid density sensor, a fluid resistivity sensor, a fluid velocity sensor, a pressure drop sensor or a combination thereof.

24. A hydrocarbon well, comprising:
a wellbore that extends between a surface region and a subterranean formation;
a tubular body that defines a wellbore conduit that extends within the wellbore;
a plunger comprising a substantially cylindrical body;
at least one sensor disposed along the tubular body;
at least one sensor communications node placed along the tubular body and affixed to a wall of the tubular body, the sensor communications node being in electrical communication with the at least one sensor and configured to receive signals therefrom;
a topside communications node placed proximate a surface;
a plurality of intermediate communications nodes spaced along the tubular body and attached to the wall of the tubular body; wherein the intermediate communications nodes are configured to acoustically transmit signals received from the at least one sensor communications node to the topside communications node in substantially a node-to-node arrangement, wherein the acoustically transmitted signals are propagated along the tubular body between adjacent intermediate communications nodes;
a receiver at the surface configured to receive signals from the topside communications node; and
a plunger control system structured and arranged to communicate with the topside communications node.

25. The hydrocarbon well of claim 24, wherein the plurality of intermediate communications nodes are configured to transmit acoustic waves in combination with one or more of radio waves, low frequency electromagnetic waves, inductive electromagnetic waves, or light.

26. The hydrocarbon well of claim 24, wherein the at least one sensor communications node is configured to transmit acoustic waves, radio waves, low frequency electromagnetic waves, inductive electromagnetic waves, light, or combinations thereof.

27. The hydrocarbon well of claim 26, wherein the plurality of intermediate communications nodes and the at least one sensor communications node are configured to transmit acoustic waves, providing real-time plunger lift information to the plunger control system.

28. The hydrocarbon well of claim 27, wherein each of the plurality of intermediate communications nodes comprises: a sealed housing; a power source residing within the housing; and an electro-acoustic transducer.

29. The hydrocarbon well of claim 28, wherein each of the plurality of intermediate communications nodes further comprises a transceiver or a separate transmitter and receiver associated with the electro-acoustic transducer structured and arranged to receive and re-transmit the acoustic waves.

30. The hydrocarbon well of claim 29, wherein the at least one sensor communications node comprises: a sealed housing; a power source residing within the housing; and an electro-acoustic transducer.

31. The hydrocarbon well of claim 30, wherein the at least one sensor communications node further comprises a transceiver or a separate transmitter and receiver associated with the electro-acoustic transducer that is structured and arranged to communicate with the at least one sensor and transmit acoustic waves in response thereto.

32. The hydrocarbon well of claim 31, wherein the acoustic waves represent asynchronous packets of information comprising a plurality of separate tones, with at least some of the acoustic waves being indicative of a property of the plunger.

33. The hydrocarbon well of claim 24, wherein the at least one sensor is selected from a plunger position sensor, a plunger wear sensor, plunger velocity sensor, a fluid density sensor, a fluid resistivity sensor, a fluid velocity sensor, a pressure drop sensor or a combination thereof.

34. The hydrocarbon well of claim 24, wherein the at least one sensor comprises a plurality of sensors.

\* \* \* \* \*